(12) United States Patent
Chan et al.

(10) Patent No.: US 11,499,831 B2
(45) Date of Patent: Nov. 15, 2022

(54) EFFECTIVE INDOOR LOCALIZATION USING GEO-MAGNETIC FIELD

(71) Applicant: The Hong Kong University of Science and Technology, Hong Kong (CN)

(72) Inventors: Shueng Han Gary Chan, Hong Kong (CN); Hang Wu, Hong Kong (CN)

(73) Assignee: THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 641 days.

(21) Appl. No.: 16/469,127

(22) PCT Filed: Feb. 5, 2018

(86) PCT No.: PCT/CN2018/075253
§ 371 (c)(1),
(2) Date: Jun. 12, 2019

(87) PCT Pub. No.: WO2018/145611
PCT Pub. Date: Aug. 16, 2018

(65) Prior Publication Data
US 2020/0103232 A1 Apr. 2, 2020

Related U.S. Application Data

(60) Provisional application No. 62/499,987, filed on Feb. 10, 2017.

(51) Int. Cl.
*G01C 21/00* (2006.01)
*G01C 21/20* (2006.01)
(Continued)

(52) U.S. Cl.
CPC .......... *G01C 21/206* (2013.01); *H04W 24/08* (2013.01); *H04W 84/12* (2013.01)

(58) Field of Classification Search
CPC ..... G01C 21/206; G01C 21/00; H04W 24/08; H04W 84/12; G01S 5/0252; G01S 5/16
(Continued)

(56) References Cited

U.S. PATENT DOCUMENTS 7,302,345 B2    11/2007  Kwon et al.
8,514,131 B2 *   8/2013  Jovicic ................. G01S 5/0278
                                                              342/451
(Continued)

FOREIGN PATENT DOCUMENTS

CN    103175529 A    6/2013
CN    106092093 A    11/2016
(Continued)

OTHER PUBLICATIONS

International Search Report and Written Opinion for PCT Application No. PCT/CN2018/075253 dated Apr. 27, 2018, 7 pages.
(Continued)

*Primary Examiner* — Shardul D Patel
(74) *Attorney, Agent, or Firm* — Amin, Turocy & Watson, LLP

(57) ABSTRACT

Various embodiments disclosed herein enable a mobile device to accurately locate where the mobile device is located indoors by measuring geomagnetic fields, and tracing relative changes in the magnetic fields as the mobile device is moved. The relative changes can be compared to a fingerprint signal map, and a trace of a portion of the path can be determined by matching the relative changes in the magnetic fields to relative changes in the fingerprint signal map. A collection of the path portions can then be connected by determining a shortest path that connects each of the path portions. In another embodiment, a step counter can also be
(Continued)

used to constrain possible locations, and fuse the geomagnetic field and step counter information for joint indoor localization.

20 Claims, 16 Drawing Sheets

(51) Int. Cl.
  *H04W 24/08* (2009.01)
  *H04W 84/12* (2009.01)
(58) Field of Classification Search
  USPC ......................................................... 701/425
  See application file for complete search history.

(56) References Cited

U.S. PATENT DOCUMENTS

| | | | |
|---|---|---|---|
| 9,151,621 B2 | 10/2015 | Haverinen | |
| 2013/0177208 A1* | 7/2013 | Haverinen | G01C 21/206 702/94 |
| 2017/0089706 A1* | 3/2017 | Ribeiro | G01C 21/20 |
| 2018/0274931 A1* | 9/2018 | Noethlings | G01C 21/08 |

FOREIGN PATENT DOCUMENTS

| | | | |
|---|---|---|---|
| CN | 106092095 A | * | 11/2016 |
| CN | 106092095 A | | 11/2016 |
| CN | 106093843 A | | 11/2016 |
| FI | 124153 B | | 4/2014 |
| FI | 124665 B | | 11/2014 |
| JP | 2013210866 A | | 10/2013 |
| WO | 2014/100298 A2 | | 6/2014 |

OTHER PUBLICATIONS

Li et al., "How feasible is the use of magnetic field alone for indoor positioning?", International Conference on Indoor Positioning and Indoor Navigation, Nov. 13-15, 2012, 11 pages.
Shu et al., "Last-Mile Navigation Using Smartphones", Proc. ACM MobiCom, Sep. 7-11, 2015, 13 pages.
Chung et al., "Indoor Location Sensing Using Geo-Magnetism", Proc. ACM MobiSys, Jun. 28-Jul. 1, 2011, pp. 141-154.
Xie et al., "MaLoc: A Practical Magnetic Fingerprinting Approach to Indoor Localization using Smartphones", ACM UbiComp, Sep. 13-17, 2014, pp. 243-253.
Wu et al., Efficient Sequence Matching and Path Construction for Geomagnetic Indoor Localization, International Conference on Embedded Wireless Systems and Networks, Feb. 20-22, 2017, pp. 156-167.
Shu et al., "Magicol: Indoor Localization Using Pervasive Magnetic Field and Opportunistic WiFi Sensing", IEEE Journal on Selected Areas in Communications, vol. 33, No. 7, Jul. 2015, 14 pages.
Brajdic et al., "Walk Detection and Step Counting on Unconstrained Smartphones", Proc. ACM UbiComp, Sep. 8-12, 2013, pp. 225-234.
Smith et al., "Identification of CommonMmolecular Subsequences", Journal of Molecular Biology, vol. 147, No. 1, 1981, pp. 195-197.
He et al., "Wi-Fi Fingerprint-Based Indoor Positioning: Recent Advances and Comparisons", IEEE Communications Surveys & Tutorials, vol. 18, No. 1, 2016, pp. 466-490.
Bahl et al., "Radar: An In-Building RF-based User Location and Tracking System", IEEE Infocom, vol. 2, 2000, pp. 775-784.
Youssef et al., "The Horus WLAN Location Determination System", Proc. ACM MobiSys, 2005, 14 pages.
Goswami et al., "WiGEM: A Learning-Based Approach for Indoor Localization", ACM CoNEXT, Dec. 6-9, 2011, 12 pages.
Wu et al., "CSI-Based Indoor Localization", IEEE Trans. Parallel & Distributed Systems, vol. 24, No. 7, Jul. 2013, pp. 1300-1309.
Faragher et al., "Location Fingerprinting with Bluetooth Low Energy Beacons", IEEE JSAC, vol. 33, No. 11, Nov. 2015, pp. 2418-2428.
Yoon et al., "FM-based Indoor Localization via Automatic Fingerprint DB Construction and Matching", Proc. ACM MobiSys, Jun. 25-28, 2013, pp. 207-219.
Nirjon et al., "COIN-GPS: Indoor Localization from Direct GPS Receiving", Proc. ACM MobiSys, 2014, 14 pages.
Mariakakis et al., "SAIL: Single Access Point-Based Indoor Localization", Proc. ACM MobiSys, Jun. 16-19, 2014, 14 pages.
Xu et al., "Enhancing WiFi-based Localization with Visual Clues", Proc. ACM UbiComp, Sep. 7-11, 2015, pp. 963-974.
Yang et al., "Wearables Can afford: Light-weight Indoor Positioning with Visible Light", Proc. ACM MobiSys, May 18-22, 2015, 14 pages.
Liu et al., "Push the Limit of WiFi based localization for Smartphones", Proc. ACM MobiCom, Aug. 22-26, 2012, 12 pages.
Liu et al., "Accurate WiFi Based Localization for Smartphones Using Peer Assistance", IEEE Trans. Mobile Computing, vol. 13, No. 10, Oct. 2014, pp. 2199-2214.
Zhao et al., "Does BTLE measure up against WiFi? A comparison of indoor location performance", Proc. European Wireless Conference, May 2014, pp. 263-268.
Markham et al., "Magneto-Inductive Networked Rescue System (MINERS): Taking Sensor Networks Underground", Proc ACM/IEEE IPSN, Apr. 16-20, 2012, 11 pages.
Frassl et al., "Magnetic Maps of Indoor Environments for Precise Localization of Legged and Non-Legged Locomotion", Proc. IEEE/RSJ IROS, Nov. 3-7, 2013, 8 pages.
Wang et al., "No need to war-drive: Unsupervised Indoor Localization", Proc. ACM MobiSys, Jun. 25-29, 2012, 14 pages.
Subbu et al., "LocateMe: Magnetic-Fields-Based Indoor Localization Using Smartphones", ACM Transactions on Intelligent Systems and Technology, vol. 4, No. 4, Oct. 2013, p. 73:1-73:27.
Hilsenbeck et al., "Graph-based Data Fusion of Pedometer and WiFi Measurements for Mobile Indoor Positioning", Proc. ACM UbiComp, Sep. 13-17, 2014, pp. 147-158.
Xiao et al., "Lightweight Map Matching for Indoor Localisation using Conditional Random Fields", Proc. ACM/IEEE IPSN, 2014, pp. 131-142.
He et al., "Calibration-Free Fusion of Step Counter and Wireless Fingerprints for Indoor Localization", Proceedings of UbiCom ACM, Sep. 7-11, 2015, pp. 897-908.
Park et al., "Motion Compatibility for Indoor localization", MIT, Tech. Rep., 2014, pp. 1-14.
Zhou et al., "Use it free: Instantly Knowing Your Phone Attitude", Proc. ACM MobiCom., Sep. 7-11, 2014, pp. 605-616.
Klinger et al., "Classical Probabilistic Models and Conditional Random Fields", TU, Algorithm Engineering Report, Dec. 2007, 32 pages.
Xie et al., "A Reliability-Augmented Particle Filter for Magnetic Fingerprinting based Indoor Localization on Smartphone", Journal of Latex Class Files, vol. 13, No. 9, Sep. 2014, pp. 1-14.
Xiao et al., "Indoor Tracking Using Undirected Graphical Models", IEEE Transactions on Mobile Computing, vol. 14, No. 11, Nov. 2015, pp. 2286-2301.
Yang et al., "Locating in Fingerprint Space: Wireless Indoor Localization with Little Human Intervention", Proc. ACM MobiCom, Aug. 22-26, 2012, 12 pages.
Zijlstra, Wiebren, "Assessment of spatio-temporal parameters during unconstrained walking", European Journal of Applied Physiology, vol. 92, Feb. 17, 2004, pp. 39-44.
Li et al., "A Reliable and Accurate Indoor Localization Method Using Phone Inertial Sensors", Proc. ACM UbiComp, Sep. 5-8, 2012, pp. 421-430.
Rai et al., "Zee: Zero-effort Crowdsourcing for Indoor Localization", Proc. ACM MobiCom, Aug. 22-26, 2012, 12 pages.
Keogh et al., "Dimensionality Reduction for Fast Similarity Search in Large Time Series Databases", Knowledge and Information Systems, vol. 3, No. 3, 2001, 19 pages.
Bishop et al., "Pattern Recognition and Machine Learning", Springer, vol. 1, 2006, 755 pages.

(56) References Cited

OTHER PUBLICATIONS

Suzuki et al., "Topological Structural Analysis of Digitized Binary Images by Border Following", Computer Vision, Graphics, and Image Processing, vol. 30, No. 1, 1985, pp. 32-46.
Liu et al., "Mitosis Sequence Detection using Hidden Conditional Random Fields", IEEE International Symposium on Biomedical Imaging, 2010, pp. 580-583.
Rose et al., "Human Walking", Third Edition, Lippincott Williams & Wilkins, 2006, 246 pages.
Shin et al., "Adaptive Step Length Estimation Algorithm Using Low-Cost MEMS Inertial Sensors", IEEE Sensors Applications Symposium, Feb. 6-8, 2007, 5 pages.
Lauritzen et al., "Local Computations with Probabilities on Graphical Structures and their Application to Expert Systems", Journal of the Royal Statistical Society, Series B (Methodological), 1988, pp. 157-224.
Murphy et al., "Loopy Belief Propagation for Approximate Inference: An Empirical Study", Proceedings of the Fifteenth Conference on Uncertainty in Artificial Intelligence, 1999, pp. 467-475.
Keogh et al., "Derivative Dynamic Time Warping", SDM, vol. 1, SIAM, 2001, pp. 1-11.
Wu et al., "A Graphical Model Approach for Efficient Geomagnetism-Pedometer Indoor Localization", 14th IEEE International Conference on Mobile Ad hoc and Sensor Systems, 2017, pp. 371-379.
Ma et al., "Indoor Localization based on Magnetic Anomalies and Pedestrian Dead Reckoning", Proc. ION GNSS+, 2013, pp. 1033-1038.

\* cited by examiner

700 ⟶

---

Algorithm 1 Matching Substrings Selection Algorithm

---

Input: Fingerprint magnetic field data vector $Seq_{fingerprint}$, user observation sequence $Seq_{observe}$, matching score matrix $M_{m \times n}$ obtained from the previous magnetic field sequence matching algorithm

Output: Matched substrings

1: $D \leftarrow 0_{m \times n}$
2: while True do
3:    Select an entry $(a_1, b_1)$ with the highest score $M(a_1, b_1)$ satisfying $D(a_1, b_1) = 0$; if impossible, break the while loop
4:    if $M(a_1, b_1) < Threshold_1$ then
5:      Break
6:    end if
7:    Backtracking from $(a_1, b_1)$ to reconstruct the optimum alignment $((B_{f_{a_1}}, B_{o_{b_1}}), ..., (B_{f_{a_t}}, B_{o_{b_t}}))$ between two sequences by using $M_{m \times n}$
8:    if $t < Threshold_2$ then
9:      Break
10:   end if
11:   for all $1 \leq p \leq m, 1 \leq q \leq n$ do
12:     if $\sqrt{(a_1 - p)^2 + (b_1 - q)^2} < R$ then
13:       $D(p, q) \leftarrow 1$
14:     end if
15:   end for
16:   Calculate the maximum length of platform of $(a_1 a_2 ... a_t)$ as $Plat_{(a_1 a_2 ... a_t)} = max\{|p - q| | a_p = a_{p+1} = ... = a_q\}$. Similar calculation is also performed for $(b_1 b_2 ... b_t)$.
17:   if $Plat_{(a_1 a_2 ... a_t)} \leq Threshold_3 \wedge Plat_{(b_1 b_2 ... b_t)} \leq Threshold_3$ then
18:     Yield these two substrings as matched substrings
19:   else
20:     Discard these two substrings
21:   end if
22: end while

---
Algorithm 2 Finding Minimum Cost Path Algorithm
---
Input: Constructed graph $G$.
Output: Minimum cost path from $START$ to $END$
1: Add a new edge $e_0$ to $G$ which only connects to $START$ with both of weights 0
2: Add another new edge $e_{end}$ to $G$ which only connects with $END$ with both of weights $INT\_MAX$, a sufficiently large integer
3:   $dist[e_0] \leftarrow 0$
4: for edge $e \in G - \{e_0\}$ do
5:   $dist[e] \leftarrow \infty$
6: end for
7: for edge $e \in G$ do
8:   $back[e] \leftarrow NULL$
9: end for
10: $Q \leftarrow$ all edges in G
11: while $Q \neq \emptyset$ do
12:   Extract $e_1 \in Q$ with the minimum distance $dist[e_1]$
13:   if $e_1 == e_{end}$ then
14:     Break
15:   end if
16:   for $e_2 \in Out(e_1), b_{1y} \leq b_{2x}$ do
17:     if $dist[e_2] > dist[e_1] + cost(e_2)$ then
18:       $dist[e_2] \leftarrow dist[e_1] + cost(e_2)$
19:       $back[e_2] = e_1$
20:       remove $e_2$ from $Out(e_1)$
21:     end if
22:   end for
23: end while
24: $Backtrack \leftarrow back[e_{end}]$
25: $MinCostPath \leftarrow \emptyset$
26: while $Backtrack \neq e_0$ do
27:   $MinCostPath \leftarrow MinCostPath \cup \{Backtrack\}$
28:   $Backtrack \leftarrow back[Backtrack]$
29: end while

EFFECTIVE INDOOR LOCALIZATION USING GEO-MAGNETIC FIELD

CROSS REFERENCE TO RELATED APPLICATION

This application is a U.S. National Stage filing under 35 U.S.C. § 371 of international patent cooperation treaty (PCT) application No. PCT/CN2018/075253, filed Feb. 5, 2018, and entitled "EFFECTIVE INDOOR LOCALIZATION USING GEO-MAGNETIC FIELD", which applications claim priority to U.S. Provisional Application No. 62/499,987, filed on Feb. 10, 2017, entitled: "Effective Indoor Localization using Geo-Magnetic Field." The entireties of these applications are hereby incorporated herein by reference.

TECHNICAL FIELD

This disclosure generally relates to indoor localization of mobile devices using geo-magnetic fields and step counters to improve location accuracy and related embodiments.

BACKGROUND

Recently there has been much interest in indoor localization, mainly due to the ubiquity of smart devices and advances in their sensing capabilities. The signals studied include Wi-Fi received signal strength indicators (RSSI), channel state information (CSI), vision, visible light, ultrasound, etc. These systems require pervasive (and hence costly) or special infrastructure installations. Furthermore, the survey procedures of these systems are rather time-consuming, where signal vectors have to be collected by standing at length at different fixed points in the area.

Previous work on geomagnetic localization is predominantly on fusing pedometer (step counter) with magnetic field, using recursive Bayesian filters such as Hidden Markov Models (HMMs) and particle filters. They estimate the location based on the maximum joint probability or particle convergence, given the magnetic readings and walking distance of the target. These approaches are often computationally complex for a mobile device. Furthermore, these models work the best for partitioned indoor environments characterized by narrow corridors, where the degree of freedom for the target is low. For large spacious settings, these models barely converge to the target location.

The above-described background is merely intended to provide an overview of contextual information regarding networks, and is not intended to be exhaustive. Additional context may become apparent upon review of one or more of the various non-limiting embodiments of the following detailed description.

BRIEF DESCRIPTION OF THE DRAWINGS

Numerous aspects and embodiments are set forth in the following detailed description, taken in conjunction with the accompanying drawings, in which like reference characters refer to like parts throughout, and in which:

FIG. 7 depicts an exemplary, non-limiting algorithm for matching substrings according to an aspect or embodiment of the subject disclosure;

FIG. 10 depicts an exemplary, non-limiting algorithm for finding a minimum cost path according to an aspect or embodiment of the subject disclosure;

DETAILED DESCRIPTION

Figure 1:
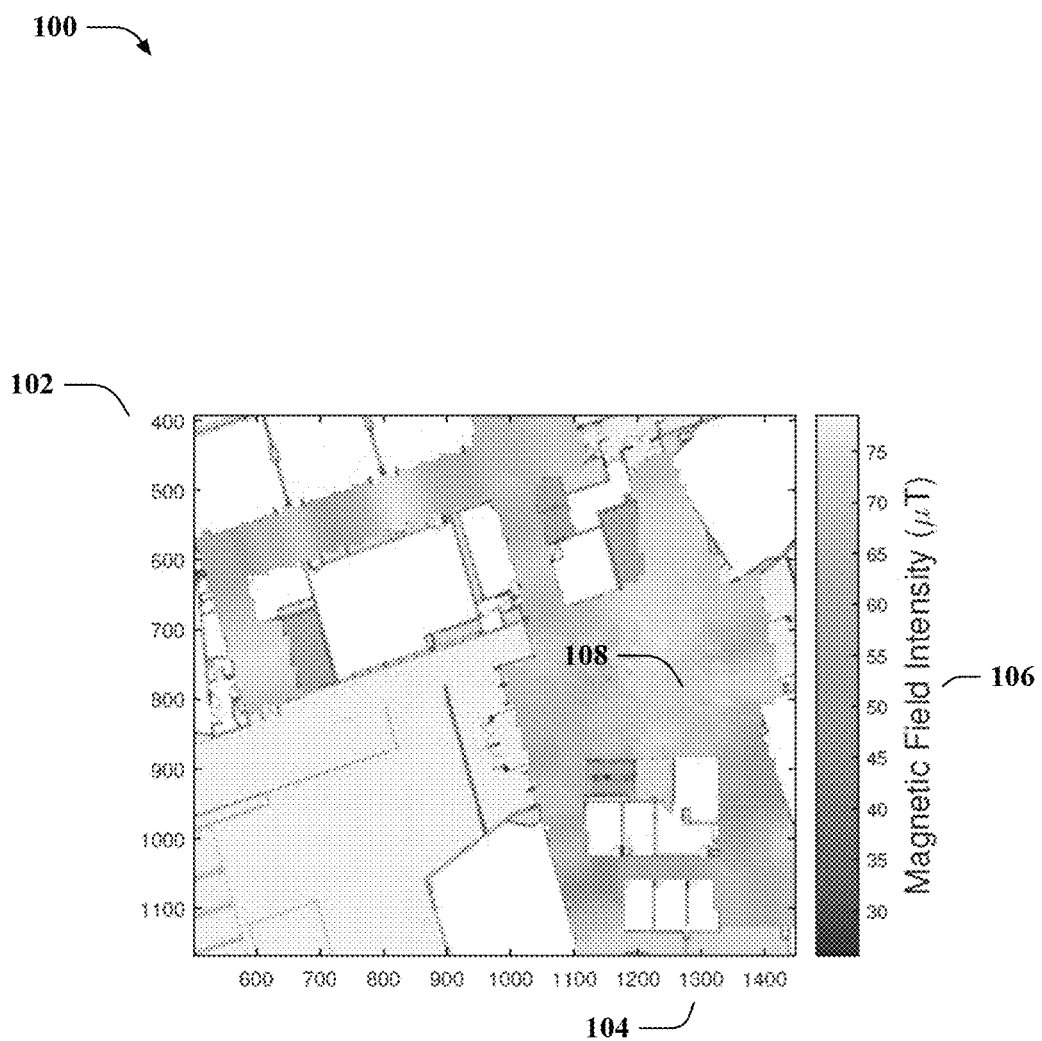
FIG. 1 is an example non-limiting schematic diagram of a magnetic fingerprint map according to an aspect or embodiment of the subject disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that the certain aspects of disclosure may be practiced without these specific details, or with other methods, components, molecules, etc. In other instances, well-known structures and devices are shown in block diagram form to facilitate description and illustration of the various embodiments. Additionally, elements in the drawing figures are not necessarily drawn to scale; some areas or elements may be expanded to help improve understanding of certain aspects or embodiments.

The terms "access point," "server," "base server," (BS) and the like, are utilized interchangeably in the subject application, and refer to a network component or appliance that serves and receives data, control, voice, video, sound, gaming, or substantially any data-stream or signaling-stream from a set of subscriber stations. Data and signaling streams can be packetized or frame-based flows. Furthermore, the terms "user," "subscriber," "customer," "consumer," and the like are employed interchangeably throughout the subject specification, unless context warrants particular distinction(s) among the terms. It should be noted that such terms can refer to human entities or automated components supported through artificial intelligence (e.g., a capacity to make inferences based on complex mathematical formalisms), which can provide simulated vision, sound recognition and so forth.

It is noted that, terms "user equipment," "device," "user equipment device," "client," and the like are utilized interchangeably in the subject application, unless context warrants particular distinction(s) among the terms. Such terms can refer to network component(s) or appliance(s) that servers and receives data, voice, video, sound, games, or substantially any data-stream or signaling-stream to or from network components and/or other devices. By way of example, a user equipment device and the like, as used herein and throughout this disclosure, can comprise a mobile device such as an electronic device capable of wirelessly sending and receiving data. A user equipment device may have a processor, a memory, a transceiver, an input, and an output. Examples of such devices include cellular telephones, personal digital assistants, portable computers, tablet computers, handheld gaming consoles, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

Furthermore, the terms "real-time," "near real-time," "dynamically," "instantaneous," "continuously," and the like are employed interchangeably or similarly throughout the subject specification, unless context warrants particular distinction(s) among the terms. It should be noted that such terms can refer to data which is collected and processed at an order without perceivable delay for a given context, the timeliness of data or information that has been delayed only by the time required for electronic communication, actual or near actual time during which a process or event occur, and temporally present conditions as measured by real-time software, real-time systems, and/or high-performance computing systems. Real-time software and/or performance can be employed via synchronous or non-synchronous programming languages, real-time operating systems, and real-time networks, each of which provide frameworks on which to build a real-time software application. A real-time system may be one where its application can be considered (within context) to be a main priority. In a real-time process, the analyzed (input) and generated (output) samples can be processed (or generated) continuously at the same time (or near the same time) it takes to input and output the same set of samples independent of any processing delay.

Aspects or features of the subject specification can be exploited in substantially any radio access network employing respective radio access technologies, e.g., Wi-Fi, global system for mobile communications, universal mobile telecommunications system, worldwide interoperability for microwave access, enhanced general packet radio service, third generation partnership project long term evolution, fourth generation long term evolution, third generation partnership project 2, ultra mobile broadband, high speed packet access, Zigbee, $x^{th}$ generation, long term evolution, or another IEEE 802.XX technology. Additionally, substantially all aspects of the subject specification can be exploited in legacy telecommunication technologies.

The systems and methods disclosed herein, in one aspect thereof, can enable a mobile device to accurately locate where the mobile device is located indoors by measuring geomagnetic fields, and tracing relative changes in the magnetic fields as the mobile device is moved. The relative changes can be compared to a fingerprint signal map, and a trace of a portion of the path can be determined by matching the relative changes in the magnetic fields to relative changes in the fingerprint signal map. A collection of the path portions can then be connected by determining a shortest path that connects each of the path portions. In another embodiment, a step counter can also be used to constrain possible locations, and fuse the geomagnetic field and step counter information for joint indoor localization.

A first embodiment of the solution uses just a geomagnetic field to locate the mobile device and is called Magil (short for Magnetic fields for indoor localization). The second embodiment combines the geomagnetic fields with step counter information and is called Mapel (short for geomagnetism and pedometer for indoor localization).

Magil initially takes in the spatially-labeled geomagnetism signal map which is collected offline. During the online location estimation, Magil measures a sequence of magnetic signals along the path the user is walking. It then finds the trace of signals most matched with the user observations against the geomagnetism signal map, and returns the trace to the user. More specifically, in Magil, we first preplan survey paths to cover the area of interests. Then we collect magnetic field signals along the paths as fingerprints. Based on these fingerprints, in the online location estimation we use our proposed modified Smith-Waterman algorithm to find the segments with fingerprint variation best matched with the target observations. In this way, target movements can be represented as a series of matched segments in fingerprints (and thus movements in real world locations). By modeling the localization problem as a modified shortest path problem, the matched segments can be ordered properly to yield the target locations over time.

In the Mapel embodiment, self-calibrate the stride size (step length) of the target, and hence can adapt to heterogeneous users without any explicit user input. Mapel works as follows. The whole area is discretized into closely spaced nodes (separated by, say, 0.5 to 1 meter), which form a lattice. Each node of the lattice corresponds to a possible position of the target. Based on the joint information of step counter and the pattern of collected magnetic field, target motion can be represented by neighboring transition between nodes in the lattice. The transition probability and walking distance of the user can then be jointly estimated by applying conditional random field (CRF), with the target localized by maximizing the overall likelihood.

"Logic" as used herein and throughout this disclosure, refers to any information having the form of instruction signals and/or data that may be applied to direct the operation of a processor. Logic may be formed from signals stored in a memory device. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

It is noted that user equipment devices can communicate with each other and with other elements via a network, for instance, a wireless network, or a wireline network. A "network" can include broadband wide-area networks such as cellular networks, local-area networks, wireless local-area networks (e.g., Wi-Fi), and personal area networks, such as near-field communication networks including BLUETOOTH®. Communication across a network is preferably packet-based; however, radio and frequency/amplitude modulations networks can enable communication between communication devices using appropriate analog-digital-analog converters and other elements. Communication is enabled by hardware elements called "transceivers." User equipment devices can have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device. A Wi-Fi network is accessible via "access points" such as wireless routers, etc., that communicate with the Wi-Fi transceiver to send and receive data. The Wi-Fi network can further be connected to the internet or other packet-based networks. The "bandwidth" of a network connection or an access point is a measure of the rate of data transfer, and can be expressed as a quantity of data transferred per unit of time. Additionally, communication (e.g., voice and/or data traffic) between one or more components can include, wired communications (routed through a backhaul broadband wired network, an optical fiber backbone, twisted-pair line, T1/E1 phone line, digital subscriber line, coaxial cable, and/or the like), and or radio broadcasts (e.g., cellular channels, Wi-Fi channels, satellite channels, and/or the like).

A network, as used herein, typically includes a plurality of elements that host logic for performing tasks on the network. The logic can be hosted on servers. In modern packet-based wide-area networks, servers may be placed at several logical points on the network. Servers may further be in communication with databases and can enable communication devices to access the contents of a database. Billing servers, application servers, etc. are examples of such servers. A server can include several network elements, including other servers, and can be logically situation anywhere on a service provider's network, such as the back-end of a cellular network.

Various embodiments disclosed herein include a mobile device that has a processor and a memory that stores executable instructions, that when executed by the processor facilitate performance of operations. The operations include measuring a magnetic field intensity and a magnetic field vector at defined intervals, resulting in a sequence of magnetic field measurements. The operations also include matching relative changes in the magnetic field measurements to a fingerprint signal map and based on the matching, determining a path segment that is a portion of a path traversed by the mobile device. The operations also include ordering a group of path segments, comprising the path segment, based on index numbers associated with respective magnetic field measurements of the group of path segments, resulting in an ordered group of path segments. The operations can also include determining the path traversed by the mobile device by determining a path associated with the ordered group of path segments.

In another embodiment, a method includes measuring, using a magnetometer of a mobile device comprising a processor, a magnetic field intensity and magnetic field vector at predetermined intervals, resulting in a sequence of magnetic field measurements. The method further includes determining, using a pedometer sensor of the mobile device, a number of steps taken and an orientation of the steps. The method additionally includes matching, by the mobile device, relative changes in the magnetic field measurements to a fingerprint signal map. The method can additionally include based on the matching, the number of steps and the orientation of the steps, determining, by the mobile device, a location of the mobile device.

In another embodiment, a computer-readable storage device storing computer-executable instructions that, in response to execution, cause a system comprising a processor to perform operations. The operations include collecting a group of magnetic field measurements, wherein each magnetic field measurement of the group of magnetic field measurements is collected after a respective predefined time interval. The operations also include determatching relative changes in the group of magnetic field measurements to a relative magnetic field levels associated with a fingerprint signal map and based on the matching, determining a path segment that is a portion of a path that has been traversed by a mobile device. The operations further include ordering a group of path segments, comprising the path segment, based on index numbers associated with respective magnetic field measurements of the group of path segments, resulting in an ordered group of path segments. The operations also include determining the path traversed by the mobile device by determining a path associated with the ordered group of path segments.

FIG. 1 is an example non-limiting schematic diagram 100 of a magnetic fingerprint map 108 according to an aspect or embodiment of the subject disclosure. The fingerprint map can be constructed by a mobile device or other device equipped with a magnetometer that can record magnetic field intensities and orientations. In an embodiment, a mobile device or other collector can follow a predetermined survey path and record magnetic field measurements at defined intervals. Based on the timestamp of the recordings, the magnetic field measurements can be localized. The mobile device can include a pedometer and other motion sensors so that the step length, speed, and orientation of the device can be measured as well to improve the location.

A surveyor carries a smartphone walking in the area. On each walking trajectory, geo-magnetic field signals and corresponding timestamps are fed to the module magnetic field data preprocessing. Given the map information, the module generates the fingerprint signal map 108 which is stored in the database for online use. The finger print map can have axes 102 and 104 that define the position, and a heat map legend 106 can provide the magnetic field intensity of the fingerprint signal map 108.

Figure 2:
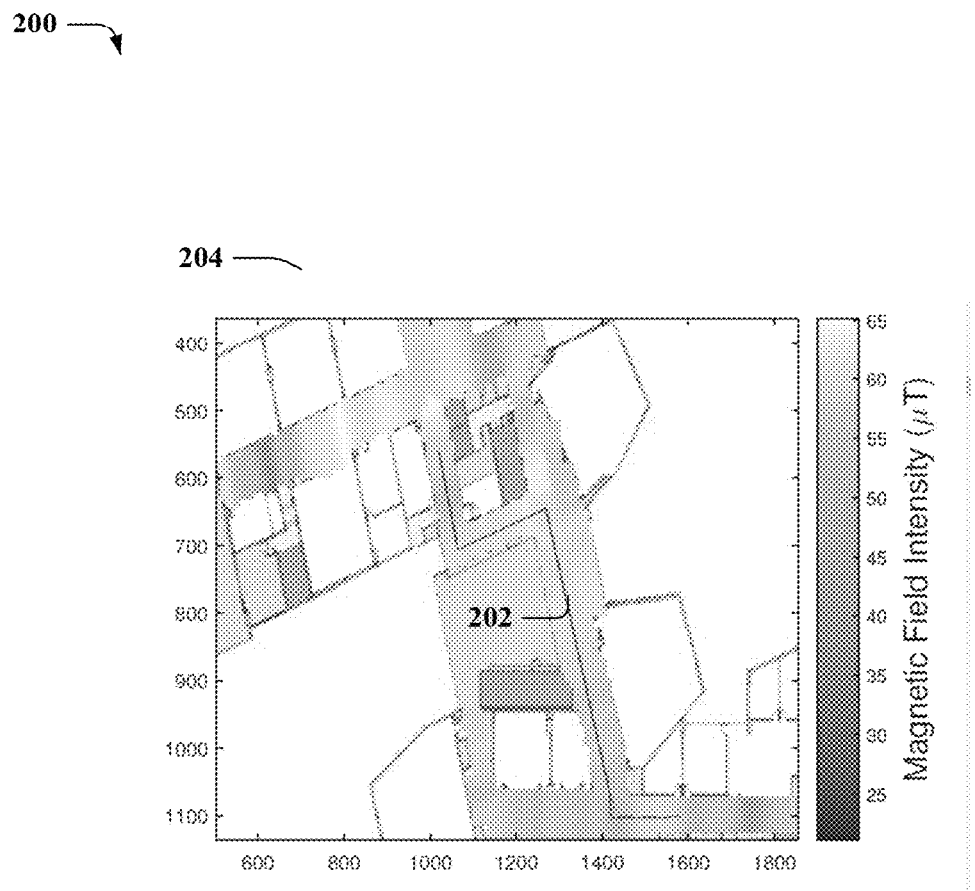
FIG. 2 is an example non-limiting schematic diagram of a magnetic fingerprint map and a traced route according to an aspect or embodiment of the subject disclosure.

Turning now to FIG. 2, illustrated is an example non-limiting schematic diagram 200 of a magnetic fingerprint map 204 and a traced route 202 according to an aspect or embodiment of the subject disclosure. The traced route 202 can be the result of either the Magil embodiment localization solution or the Mapel embodiment localization solution.

Figure 3:
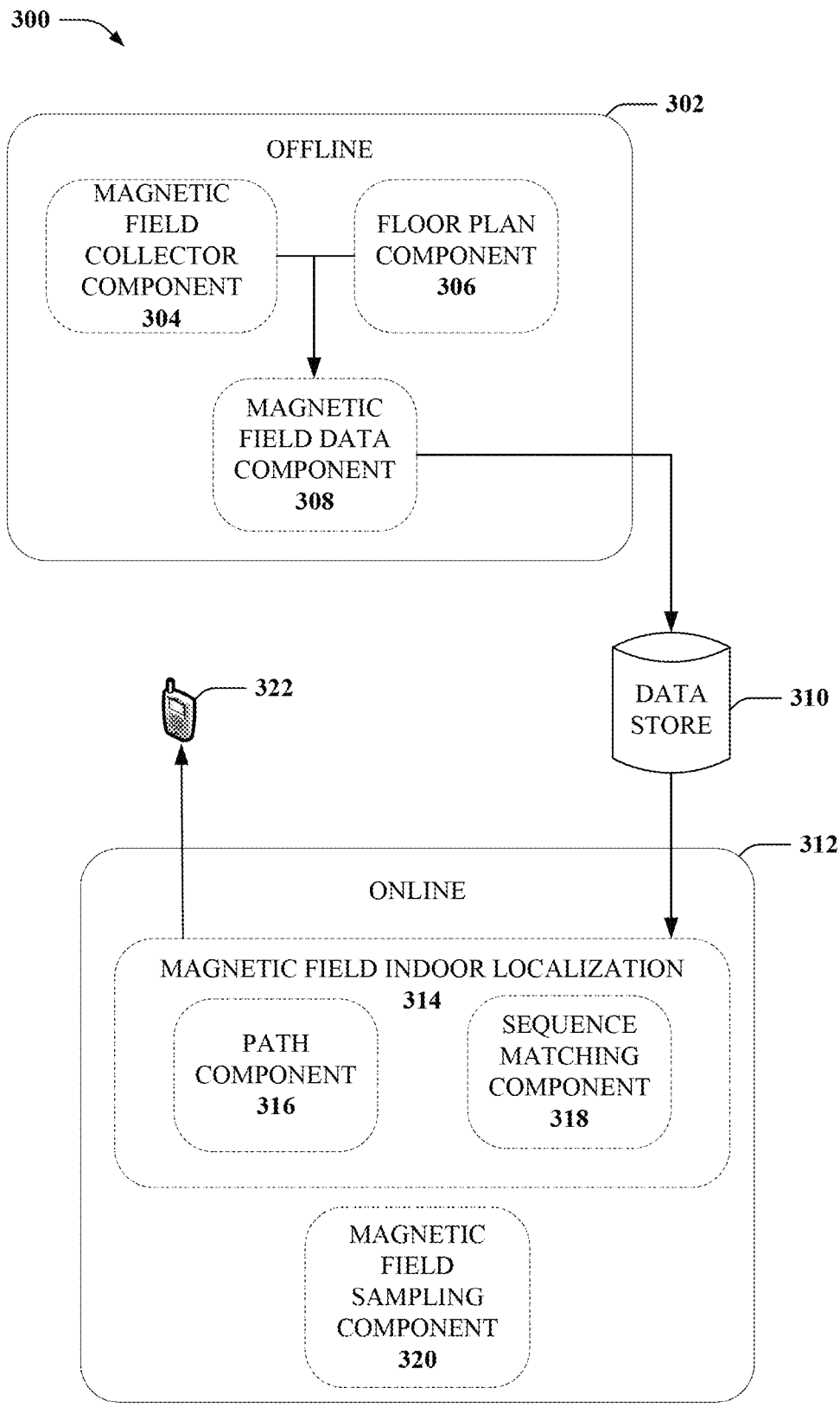
FIG. 3 is an example non-limiting schematic diagram of a geomagnetic field location system according to an aspect or embodiment of the subject disclosure.

FIG. 3 illustrates an example non-limiting schematic diagram 300 of a geomagnetic field location system according to an aspect or embodiment of the subject disclosure. It is to be appreciated that the components described herein are located outside the mobile device 322, that is merely for ease of representation, and that the mobile device comprises the components described herein.

During an offline phase 302, the components can be utilized to generate the fingerprint signal map. A magnetic field collector component 304 (e.g., a magnetometer and related processing circuitry) gathers magnetic field measurement comprising both intensities, and field vectors (orientation of the magnetic field). The field measurements are overlayed over the floor plan provided by the floor plan component 306, and analyzed by the magnetic field data component 308 to generate the fingerprint signal map.

Figure 5:
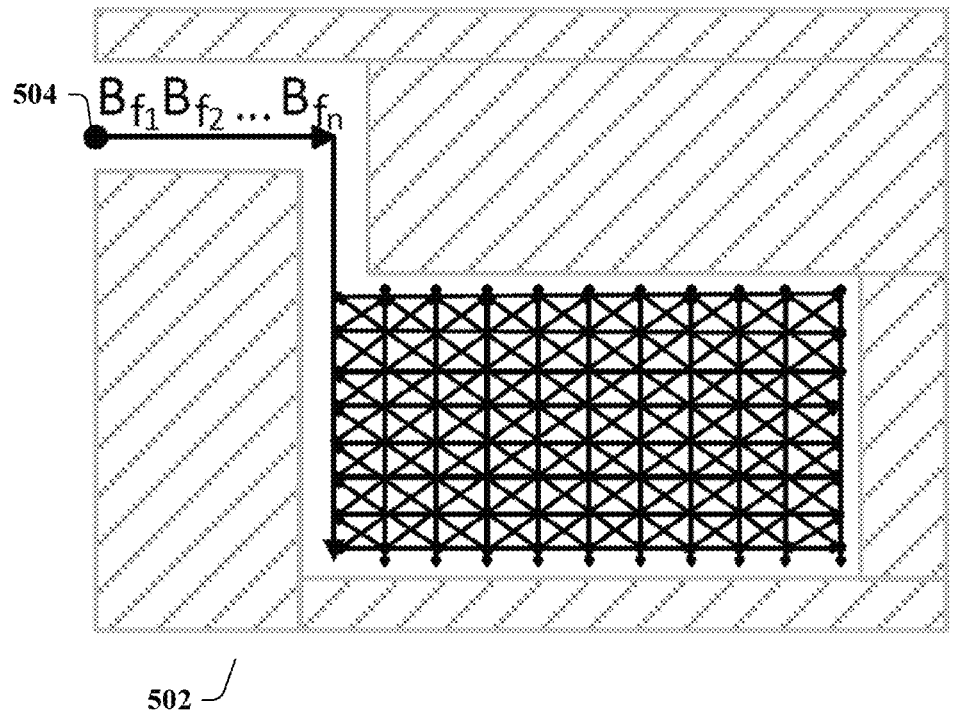
FIG. 5 is an example non-limiting schematic diagram of a survey path according to an aspect or embodiment of the subject disclosure.

In both the Magil and Mapel embodiments, survey paths can be preplanned from the floor map we obtain in the map preprocessing step. Typically these paths should be along the corridors, across lobbies and at peripheries of obstacles and cover various walking directions. For an extremely large open space, we can add more paths to ensure the coverage on positions and walking directions of interests. An example is shown in FIG. 5, where a large indoor area is covered by many survey paths in any potential directions. Note that we can adaptively align the survey paths according to the site shape. For example, in constrained corridors we align the trajectories along the accessible paths, while in open space we may align them in intersecting parallels. Note that for each survey path, we only need to walk along one direction to collect the fingerprint data. As the surveyor walks along paths and meanwhile his/her smartphone records magnetic field data and corresponding timestamps during the walk. Note that the surveyor should walk at a roughly constant speed for better data-trajectory matching.

The magnetic field data component 308 maps the actual trace against the preplanned path based on data timestamps and turns. We calculate the locations of intermediate magnetic field data proportionally according to their timestamps and the overall time interval between two turns. The location of each collected magnetic field data is interpolated into segments of preplanned paths proportional to their timestamp differences. After this, Piecewise Aggregate Approximation (PAA) is performed separately on the magnetic field data of each survey path to reduce the data dimensionality. More specifically, denote the length of data as n. Then the data is partitioned into n 10 equally-sized frames, within each of which we calculate the mean value of the data. A vector of these mean values from all frames becomes the dimension reduced representation of the data and is stored in the database. Note that the PAA procedure is for the database construction of Magil. On the other hand, we build another magnetic field fingerprint database for Mapel by extrapolating the magnetic field data of given positions using Gaussian interpolation.

The fingerprint signal map can then be stored in a datastore 310 on the mobile device 322 and during an online phase 312, the magnetic field indoor localization system 314 can locate the position of the mobile device 322. The magnetic field sampling component 320 takes magnetic field measurements at predefined intervals, and a sequence matching component 318 uses the modified Smith-Waterman algorithm to find those matched segments of magnetic field signals between the fingerprints and the target observations. Then, the path component 316 determines the shortest path associated with the matched segments. By solving this problem, we reorder the matched segments properly and find the trace of the user and yield the location estimation. Finally, the location results are returned to the user.

Figure 4:
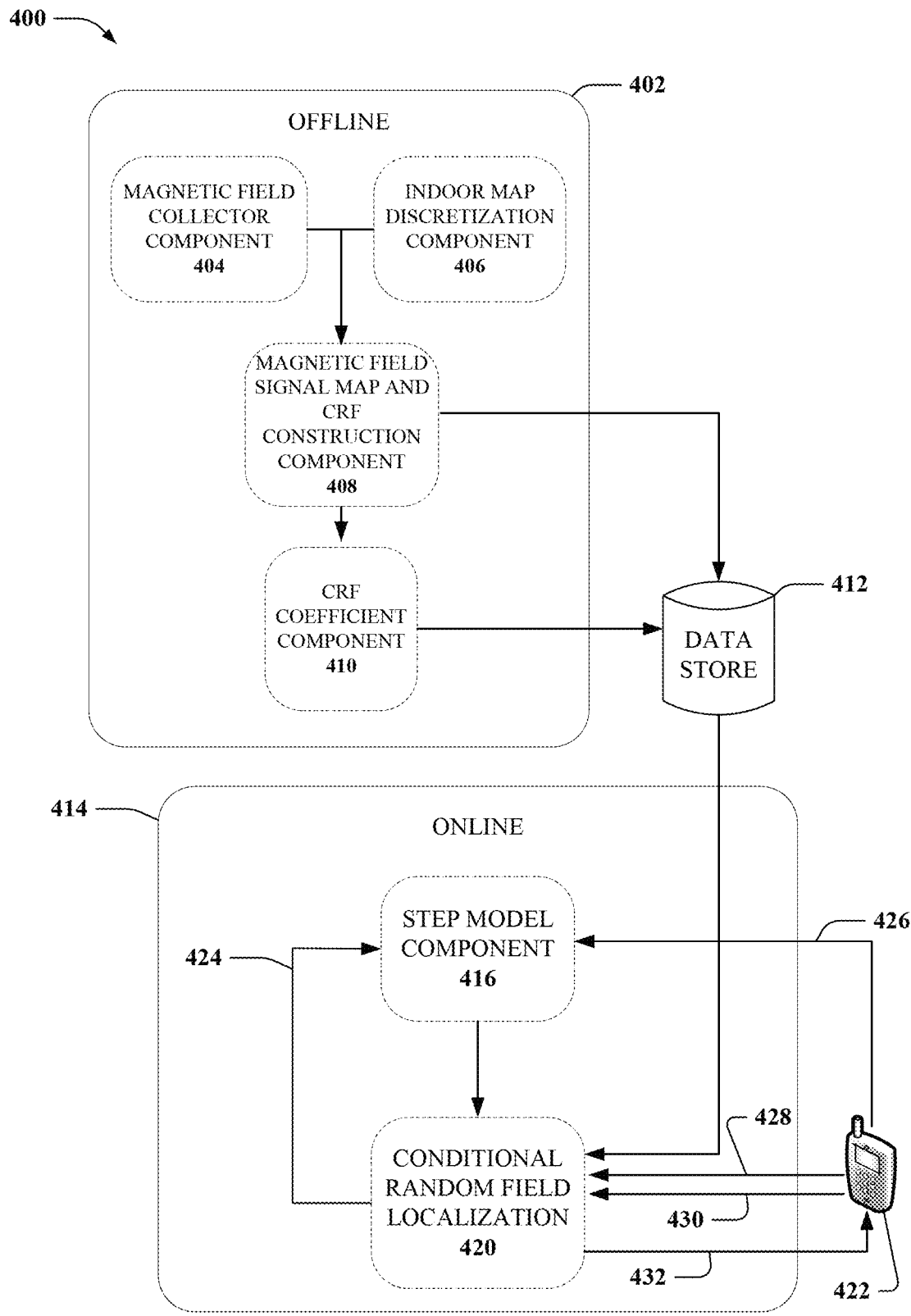
FIG. 4 is an example non-limiting schematic diagram of a geomagnetic field and step counter location system according to an aspect or embodiment of the subject disclosure.

FIG. 4 illustrates an example non-limiting schematic diagram 400 of a geomagnetic field and step counter localization system according to an aspect or embodiment of the subject disclosure. It is to be appreciated that the components described herein are located outside the mobile device 422, that is merely for ease of representation, and that the mobile device 422 comprises the components described herein.

During an offline phase 402, the components can be utilized to generate the fingerprint signal map. In the offline phase, a smartphone is carried, a magnetic field collector component 404 collect magnetic field data while walking on pre-defined paths. On the walking trajectory, the step counter is used to label the locations of geomagnetic field signals. Given map information, we then perform indoor map discretization by the indoor map discretization component 406 to construct the CRF structure (i.e., the lattice and feature functions) e.g., by the magnetic field signal map and CRF construction component 408. We then conduct offline training to determine the coefficients for the CRF feature functions by the CRF coefficient component 410. The signal map and the calibrated CRF (including structure, feature functions and their coefficients) are then stored in the magnetic field fingerprint and CRF datastore at 412.

During an online phase 414, user measures the geomagnetic field by the mobile device 422 and sends the magnetic field 428 and orientation information 430 to the conditional random field localization component 420. The mobile device 422 also sends step counter information 426 to the step model component 416. while his step counter returns the step count and orientation. Mapel works with a general step model, and then adaptively self-calibrates the physical walking parameters via feedback 424 to the step model component 416, and then the conditional random field localization component returns the location 432 to the mobile device 422 based on the maximum likelihood.

Turning now to FIG. 5, illustrated is an example non-limiting schematic diagram 500 of a survey path 504 in an area 502 according to an aspect or embodiment of the subject disclosure.

The survey path 504 can be performed while taking magnetic field measurements at predefined intervals, and can be used for both the Magel embodiment as well as the Mapel embodiment. The magnetic field vector $B_p$ can be measured by a smartphone's magnetometer, but the raw magnetic readings are under the smartphone's coordinate system. We can transform the readings into the one under the earth coordinate system by the yaw $\psi$, pitch $\theta$ and roll $\varphi$ of the smartphone, i.e., $$B_p = R_x(\theta) R_y(\varphi) R_z(\psi) B_e \qquad \text{Equation 1}$$

where $B_e$ is the magnetic field vector at the same location in terms of the earth coordinate system, and $R_x(\theta)$, $R_y(\varphi)$, $R_z(\psi)$ are corresponding rotation matrices w. r. t. the three axes of the smartphone. Then we obtain $$B_e = R_z^{-1}(\psi) R_y^{-1}(\varphi) R_x^{-1}(\theta) B_p \qquad \text{Equation 2}$$

In this way, we can measure the magnetic field Be irrespective of the dynamic smartphone headings. However we do not use $B_e$ directly as the observation since smartphone heading estimation is error prone and these errors will be amplified on Be. Some suggest using the magnitude of $B_p$ as fingerprints because it is rotation invariant scalar quantity and quite stable. However there is only one fingerprint dimension, which reduces the uniqueness of fingerprints. On the other hand, most smartphones have been equipped with gravity sensors which sense the direction of gravity and is stable with location and time. Therefore, we can retrieve both the vertical and horizontal components (w. r. t. gravity), $B_v$ and $B_h$, of $B_p$ and combine them with the magnitude of $B_p$ to generate an observation at location o, i.e., $$B_o = (\|B_p\|, B_v, B_h) \quad \text{Equation 3}$$

In the offline phase of both Magil and Mapel, magnetic field data collection and database construction is performed as follows.

Survey Path Planning:

Several survey paths are preplanned from the floor map we obtain in the map preprocessing step. Typically these paths should be along the corridors, across lobbies and at peripheries of obstacles and cover various walking directions. For an extremely large open space, we can add more paths to ensure the coverage on positions and walking directions of interests. An example is shown in FIG. 32, where a large indoor area is covered by many survey paths in any potential directions. Note that we can adaptively align the survey paths according to the site shape. For example, in constrained corridors we align the trajectories along the accessible paths, while in open space we may align them in intersecting parallels. Note that for each survey path, we only need to walk along one direction to collect the fingerprint data Magnetometer and Motion Sensor Measurement:

A surveyor walks along paths and meanwhile his/her smartphone records magnetic field data and corresponding timestamps during the walk. Note that the surveyor should walk at a roughly constant speed for better data-trajectory matching.

TABLE 1

| Notations | Definitions |
| --- | --- |
| $B_p$ | Geomagnetism reading under phone coordinate system |
| $B_o$ | Geomagnetism observation under earth coordinate system |
| $\langle B_{o_1} B_{o_2} \ldots B_{o_m} \rangle$ | User observation sequence $Seq_{observe}$ whose length in m |
| $\langle B_{f_1} B_{f_2} \ldots B_{f_n} \rangle$ | A fingerprint magnetic field data vector $Seq_{fingerprint}$ whose length is n |
| G | The corresponding graph generated by transforming all matched parts of fingerprints and user observations |
| N | The number of vertexes in G |
| M | The number of edges in G |

Data-Trajectory Matching and Data Preprocessing:

actual trace is mapped against the preplanned path based on data timestamps and turns. We calculate the locations of intermediate magnetic field data proportionally according to their timestamps and the overall time interval between two turns. The location of each collected magnetic field data is interpolated into segments of preplanned paths proportional to their timestamp differences. After this, Piecewise Aggregate Approximation (PAA) is performed separately on the magnetic field data of each survey path to reduce the data dimensionality. More specifically, denote the length of data as n. Then the data is partitioned into n/10 equally-sized frames, within each of which we calculate the mean value of the data. A vector of these mean values from all frames becomes the dimension reduced representation of the data and is stored in the database.

It is to be appreciated that in practice, if we detect the layouts have been changed, we can recollect the fingerprints near the changed layouts and replace them accordingly; for RF signals, a simple change of layouts/access point (AP) locations or adding/removing an AP may lead to invalidations of the whole original fingerprint and a whole fingerprint recollection is needed.

Figure 6:
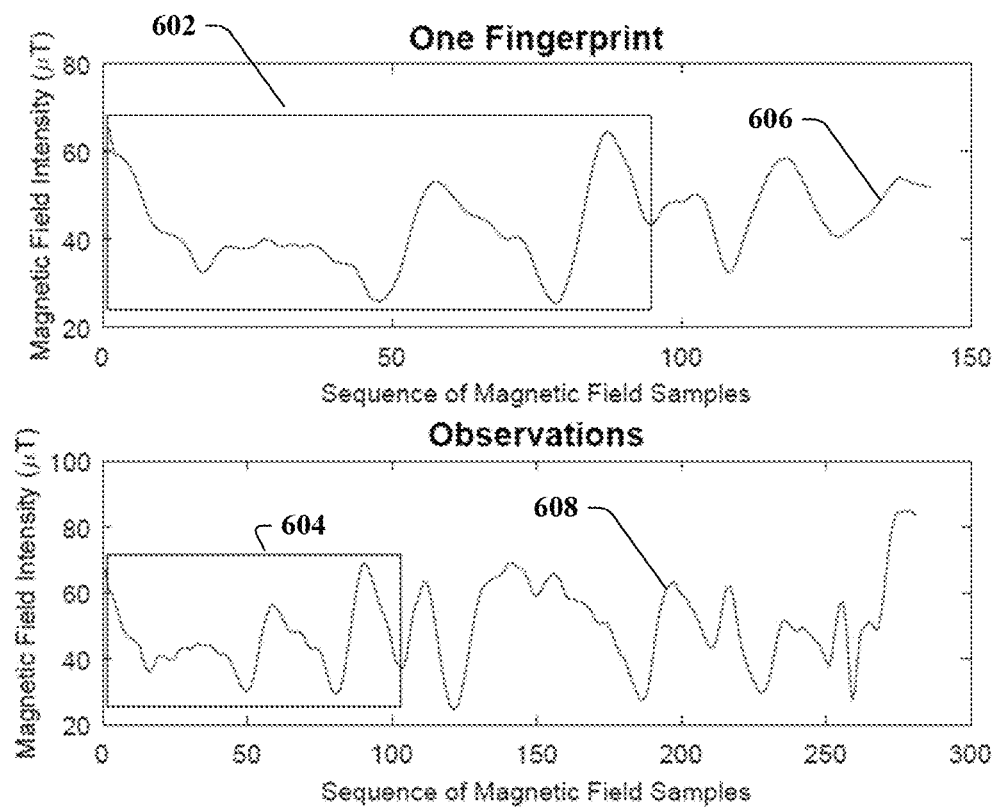
FIG. 6 is an example non-limiting graph showing magnetic field samples and matching portions according to an aspect or embodiment of the subject disclosure.

Turning now to FIG. 6, illustrated is an example non-limiting graph 600 showing magnetic field samples and matching portions according to an aspect or embodiment of the subject disclosure. The graph shown in FIG. 6 relates to the matching that the sequence matching component 318 can perform, and can be used in both Magil and Mapel. The sequence of magnetic field measurements 608 collected by the mobile device can be compared to a fingerprint sequence 606, and a portion of the measurement sequence 604 can be determined to match a portion 602, indicating that the mobile device traversed a known path segment.

The user's smartphone first samples a sequence of magnetic field data, and Magil performs the similar PAA on the geomagnetism data to obtain a shorter sequence of magnetic field observations. In order to match the geomagnetism sequence, we modify the Smith-Waterman algorithm to determine the similarity between the signal observations from the user and the observations from survey paths. Given the matching results, we convert them into vertices and a graph, formulate a shortest path problem, and solve it efficiently via a modified Dijkstra algorithm.

We first match the user magnetic observations against the fingerprint. FIG. 33 shows a matching example between a observation sequence and the fingerprint. We can clearly see that the parts 602 and 604 in the boxes match each other well. The problem here is how to identify the similar parts among sequences. We devise a magnetic field sequence matching scheme by modifying the Smith-Waterman algorithm. Smith-Waterman algorithm is a dynamic programming algorithm for performing local sequence alignment which has been widely used in bioscience (e.g. to determine similar regions between two strings of nucleotides or protein sequences).

We make modifications to the original Smith-Waterman algorithm to support the magnetic field sequence matching. We denote an observed sample (after performing PAA) as $B_o$ and the user observation sequence as $Seq_{observe} = \{B_{o1} B_{o2} \ldots B_{om}\}$ where m is the sequence length. Note that each magnetic field observation $B_o$ can be viewed as a point in 3D space. We also denote a magnetic field fingerprint data vector as $Seq_{fingerprint} = \{B_{f1} B_{f2} \ldots B_{fn}\}$ where $B_{fi}$ is the i-th fingerprint magnetic field data (which is also an observation). However we cannot determine whether $B_{oi}$ matches $B_{fj}$ by simply calculating their Euclidean distance, since different devices may yield different magnetic field values even if samples are collected at the same place. FIG. 2 also shows this characteristic. To address this, our key observation is that the differences between readings among different devices are almost the same despite locations. Let dist(•, •) be the Euclidean distance between two samples. Based on the observation, we can make use of this and determine $B_{oi}$ and $B_{fj}$ match with each other if and only if $g(o_i, f_j)$, the average Euclidean distance between adjacent samples of $B_{oi}$ and $B_{fj}$ after the mean removal, is less than a certain threshold, i.e., $$g(o_i, f_j) < \text{Threshold where} \quad \text{Equation 4}$$

$$g(o_i, f_j) = \quad \text{Equation 5}$$
$$C \cdot \sum_{t=-window}^{window} \text{dist}(B_{oi+t} - \text{Mean}(o_i), B_{fj+t} - \text{Mean}(f_j)),$$

$$\text{Mean}(o_i) = C \cdot \sum_{t=-window}^{window} B_{oi+t},$$

-continued $$\text{Mean}(f_j) = C \cdot \sum_{t=-window}^{window} B_{f_j+t},$$

$$C = 1/(2 \cdot window + 1).$$

Equation 6

In practice we empirically set window=5 and Threshold=2 µT, which balances the robustness and reasonable computation time. We assign a score 1 for matches and the penalty cost for mismatches is set to an empirical value of −1 which yields a competitive performance in practice. We perform this modified Smith-Waterman sequence matching algorithm on each original magnetic field fingerprint data vector $\{B_{f1}B_{f2} \ldots B_{fn}\}$ and its corresponding reversed fingerprint data vector $\{B_{fn}B_{fn-1} \ldots B_{f1}\}$, since the user can walk in two different directions along the same path.

After running the sequence matching algorithm for a magnetic field fingerprint data vector and a user observation sequence, we can obtain several possible matched substrings with high matching scores. Note that a substring of the user observation sequence can match many substrings of the magnetic field fingerprint data vector due to the similarities in magnetic field data, and a substring of fingerprint magnetic field data vector can match many substrings of the user observation sequence because the user can walk around the same place many times. Another characteristic is that if substring a matches b with a high score, then another substring c whose position is near a can also match b with a relatively high score. We call this phenomenon pattern repetition. In order to select those substrings with high matching scores and reduce pattern repetition (thus reduce the time and space complexity), we introduce a new substring selection algorithm (Algorithm 1 shown in FIG. 7).

We use a parameter R in Algorithm 1 to determine the number of pattern repetitions. A large R will reduce pattern repetition, but it can also remove some correctly matched substrings. A small R can lead to both more pattern repetitions and more substrings. In our system we choose R=10, an empirical value which balances the time complexity and the overall performance. Note that we also use several thresholds in the algorithm. The first one, Threshold1, is to avoid the substrings whose scores are too low (thus not similar). The second one, Threshold2, is to avoid the substrings too short to match to increase robustness. The last one, Threshold3, is to avoid the substrings which have too many deletions and insertions during matching. This is because when a user walks along or near a survey path in the same walking direction and the same path as the surveyor, the observations are also order-preserving; we cannot skip too many magnetic field samples during matching since they walk through the same place.

Since a user may traverse many places, matches between the user observation sequence and one magnetic field fingerprint data vector can cover only a fraction of the whole observation sequence. We need an algorithm to combine matches among different fingerprints of magnetic field data vectors to obtain a path which covers the whole observation sequence.

More specifically, we denote that for each magnetic field fingerprint data vector $Seq_{fingerprint_i}$ we find a set of substrings $S_i = \{s_{i,1}, s_{i,2}, \ldots s_{i,k}\}$ using Algorithm 1. Each $$s_{i,j} = \langle B_{f_i,a_{j,1}} B_{f_i,a_{j,2}}, \ldots B_{f_i,a_{j,t}} \rangle (1 \le j \le k)$$

matches some part of user observations, say $$\langle B_{o_{b_1}} B_{o_{b_2}}, \ldots B_{o_{b_t}} \rangle.$$

We note that each substring $s_{i,j}$ can be also viewed as a corresponding physical route, since each sample can be mapped to a unique physical location. In the following we use the words substring and physical route interchangeably for convenience. Our target is to find an ordered sequence of substrings Seq which can together cover all user observations in order and physically connected. Here physically connected means that every two consecutive substrings in Seq are head-to-tail connected in physical locations. This constraint is necessary because user movement is continuous.

We approach this subproblem by transforming it into a shortest path problem. We consider all substrings as vertexes in a graph G. For any two vertexes, or two substrings $s_i$ and $s_j$, there is a directed edge between them if there exists some physical location LOC such that both two substrings go through the nearby LOC. Say that the nearest sample in $s_i$ to LOC is $$B_{f_i,a_x},$$

and the nearest sample in $s_j$ to LOC is $$B_{f_j,a_y}.$$

We assign two weights, $b_x$ and $b_y$, to the edge, where $$B_{o_{b_x}}$$

aligns to $$B_{f_i,a_x}$$

in $s_i$ and $$B_{o_{b_y}}$$

aligns to $$B_{f_j,a_y}$$

in $s_j$. The cost of the edge is the absolute value of the difference between $b_x$ and $b_y$. Note that $b_x$ can be smaller or bigger than $b_y$ due to the noise in magnetic field samples and alignment, and there may be many edges between two vertexes, as there can be infinity many potential LOCs if the user walks through the same place multiple times. To limit the number of edges between two vertexes, we only select those LOCs which are not so physically close, say at least 0.4 m in Euclidean distance between any two LOCs.

Finally we need to align the beginning and the end of user observations. We add two new vertexes to G: START connects to each of the substrings matching the beginning of user observations with two weights: 0 and the index of the first matched user observation (also the matched user observation with the smallest index), while END is connected by each of the substrings matching the end of user observations with two weights: the index of the last matched user observation (also the matched user observation with the largest index) and m, the length of the user observation sequence. Note that due to the noise in measurements, the beginning and the end of user observations may not be matched. Therefore, we propose that START connects to the substrings with the smallest index of the matched user observation no greater than $R_1$, and END connects to the substrings with the largest index of the matched user observation no smaller than $m-R_1$. A large $R_1$ can tolerate more noise but introduce more edges which increases the time complexity, while a small $R_1$ requires a stricter matching of the sequences but reduces the number of edges. Here we set $R_1=6$ which balances the performance of our system. We require that a valid path is a simple path where two consecutive edges, $e_1$ with weights $b_{1x}$ and $b_{1y}$, $e_2$ with weights $b_{2x}$ and $b_{2y}$, satisfy that:

$$b_{1y} \leq b_{2x} \qquad \text{Equation 7}$$

Figure 8:
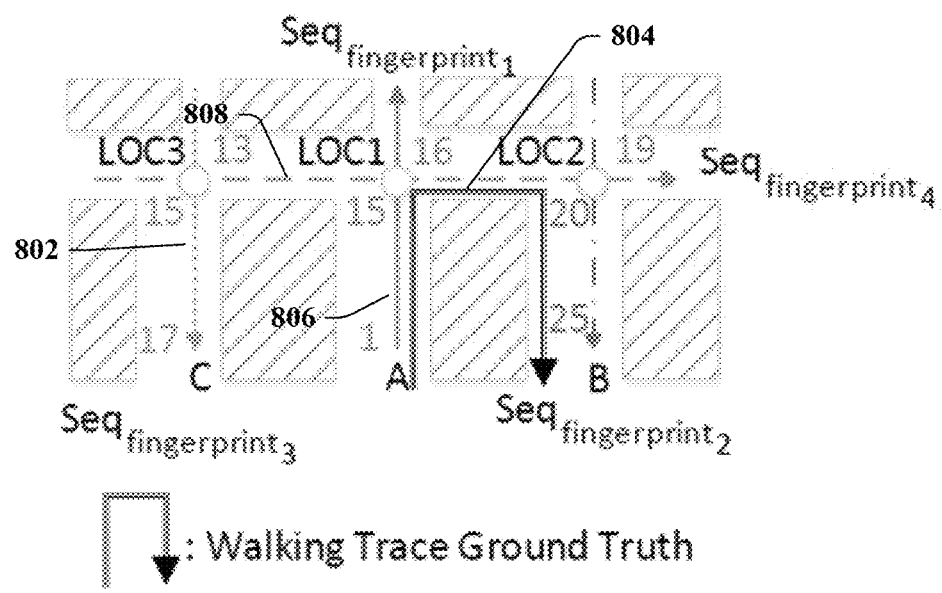
FIG. 8 is another example non-limiting schematic diagram showing a location inference from a walking trace according to an aspect or embodiment of the subject disclosure.

We illustrate an example in FIG. 8, where each arrow represents a survey path (e.g., 802) with walking direction (and thus one corresponding fingerprint vector). Suppose the user walks along the trace A-LOC1-LOC2-B (e.g., path 804). Then after applying the magnetic field sequence matching and selection (Algorithm 1), we can obtain several matched substrings. In FIG. 8, each number represents the index of user observations matching the fingerprint with the same color. For example, the first 15 samples of user observations $\{B_{o1}B_{o2} \ldots B_{o15}\}$ match a part of the trace from location A to LOC1 (e.g, trace 806) (so there are a number 1 and a number 15 near the magnetic field fingerprint data vector $Seq_{fingerprint1}$, corresponding to the beginning and the end of the matched substring, respectively), and $\{B_{o13}B_{o14} \ldots B_{o19}\}$ matches a part of the fingerprint $Seq_{fingerprint4}$ of the trace from location LOC3 to LOC2, etc. (e.g., trace 808) Note that the index of matched user observations around LOC1, LOC2 and LOC3 can be different due to the noise in measurement.

Figure 9:
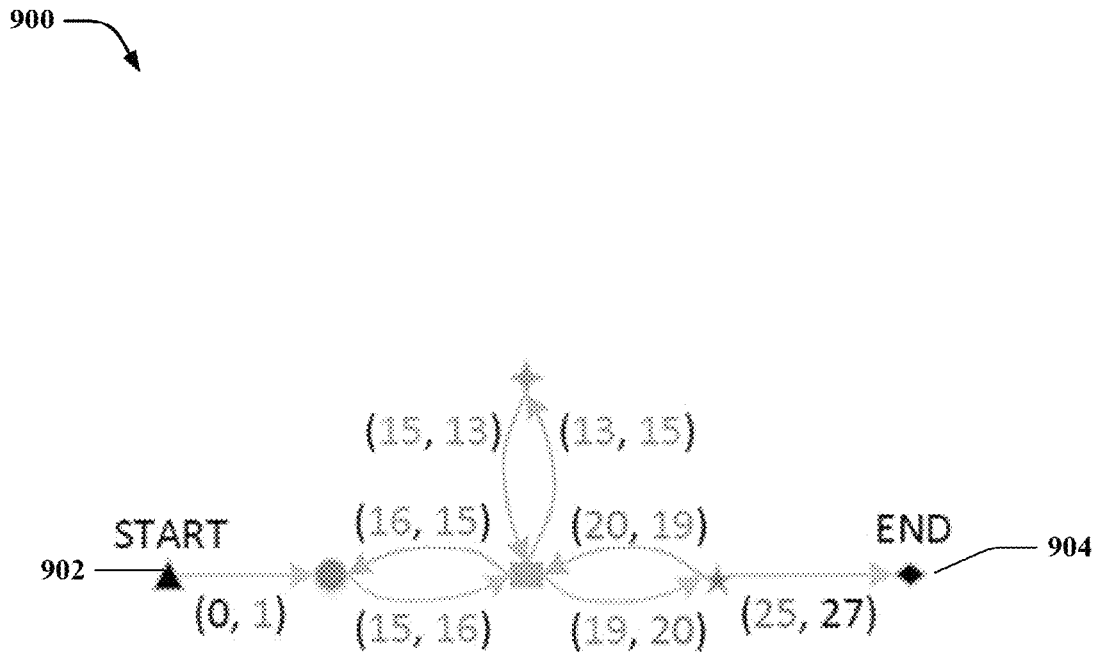
FIG. 9 is an example non-limiting graph showing a shortest path solution according to an aspect or embodiment of the subject disclosure.

After transforming this example into a shortest path problem, we obtain a graph G shown in FIG. 9 containing 4 vertexes, each of which represents a matched substring (a part of colored arrow), besides START (e.g., 902) and END (e.g., 904). Each vertex corresponds to the matched substring in FIG. 8. We can see that the corresponding simple path from START to END (which is also the only available simple path) (the term "path" means "simple path" in this patent) has edge weights (0, 1), (15, 16), (19, 20) and (25, 27), where 27 is the length of the user observation sequence. We can clearly see that the weights satisfy the condition mentioned before, thus the path is a valid path which is preferable.

Note that the corresponding path of trace A-LOC1-LOC3-C is not a valid path since (15, 16) and (13, 15) are weights belonging to two adjacent edges in the corresponding path, and they do not satisfy the constraint. Thus this path is not to be considered matching. If we walk along the trace A-LOC1-LOC3-C in reality, we will align the reversed fingerprint sequence corresponding to the orange arrow instead. Recall that the constraint ensures that samples are aligned in the correct time order. Also, we note that there is not an edge connecting the green vertex (corresponding to a matched substring in the magnetic field fingerprint data vector $Seq_{fingerprint3}$) to vertex END, since in the corresponding matched substring, the largest index of the matched user observation is only 17, which is smaller than $27-R_1=21$ (thus not close to the end of the user observation vector). So the user does not walk in that direction the green arrow shows.

We denote the cost of a path as the sum of the weights of all edges in the path. For instance, in the above example, the cost of the valid path from START to END is $|0-1|+|15-16|+|19-20|+|25-27|=5$. Then all valid paths from START to END can be viewed as possible user trajectories, and the minimum cost valid path corresponds to the estimated user trajectory where substrings can match as many user observations in the correct order as possible. In this context the minimum cost path can be viewed as the shortest path from START to END interchangeably, if we view the cost of an edge as the distance.

We denote N and M as the number of vertexes and edges in G, respectively. To solve the above shortest path problem, we need to convert the constraint into a more usable one. If we add a new edge $e_0$ to G which only connects to START with both of weights 0, and add another new edge eend to G which only connects with END with both of weights INT_MAX (a sufficiently large integer), and view edges in G as new "vertexes" in $\hat{G}$, and convert the weights of edges into weights of "vertexes" in $\hat{G}$, and add new "edges" in $\hat{G}$ between two adjacent "vertexes" $e_1$ and $e_2$ (here adjacent means that the corresponding edges of the "vertexes" are head-to-tail connected in G) if a valid path passes through those "vertexes" (or equivalently, $b_{1y} \leq b_{2x}$), then the original subproblem is equivalent to finding the shortest path (w. r. t. minimum sum of node weights instead of edge weights) from the "vertex" corresponding to $e_0$ to the "vertex" corresponding to $e_{end}$ in $\hat{G}$. However a simple implementation of the above using traditional Dijkstra's algorithm together with a min-priority queue can run in $O(N^3+N^2 \log N)$ in the worst case, which is computationally expensive, not to mention there may be a large number of "edges" which consumes much memory to store. To efficiently reduce both time and space complexity, in reality we do not construct such $\hat{G}$. Instead we maintain the shortest path from e0 to other edges separately. In each step we extract the unexplored edge with the minimum distance and update its neighbors' distances if possible. The pseudocode is as follows (Algorithm 2) 1000 shown in FIG. 10, which is adapted from the standard Dijkstra's algorithm In Algorithm 2 1000 we use $Out_{(e)}$ to represent the set of outgoing edges of e. We note a key observation that in Algorithm 2 1000 we remove some edges from $Out_{(e1)}$ after relaxation to further reduce the time complexity (line 20). This is because for each edge $e_2$, if its dist value is updated from $e_1$ at the first time, then after that its dist value cannot be updated from other $e_3$ connecting to $e_2$. Dijkstra's algorithm is a greedy algorithm which updates distances in an increasing manner, thus for any $e_3$ connecting to $e_2$ that updates dist later than $e_1$, if $b_{3y} \leq b_{2x}$, then Dijkstra's algorithm guarantees that $dist_{[e3]} \geq dist_{[e1]}$; if $b_{3y} > b_{2x}$, then $e_3$ cannot further update $dist_{[e2]}$ due to the constraint in line 16 in Algorithm 2 1000. In this way we can see that each edge in G can be updated at most once, and the overall time complexity can be reduced to $O(M \log M)$, or roughly $O(N^2 \log N)$ after using our algorithm. Finally we can backtrack the shortest path from END to START (line 24-29) and obtain the estimated user trajectory by mapping the matched parts of the magnetic field fingerprint data vector back to the real world coordinates.

It is also worth noting that provided with Wi-Fi or iBeacon fingerprints, our algorithm can be modified to fuse with that signal easily. Say that at some time we collect both magnetic field and Wi-Fi signals. After comparing the received signal strength indicator values with the fingerprint, we know some potential locations of the user at that time. For the aggregation including that magnetic field observation, we can match it only with those magnetic field fingerprint data vectors which are close to those potential locations, instead of matching it with all fingerprint data vectors. This can help reduce the overall computation time and increase localization accuracy.

The time complexity of the magnetic field sequence matching and selection (Algorithm 1) is:

$$O\left(mn\left(1+\frac{1}{R^2}\right)\right), \quad \text{Equation 8}$$

where m is the length of user observation sequence, n is the maximum length of magnetic field fingerprint data vector and R is the parameter mentioned in Algorithm 1, since the time complexities for matching and substring selection are $$O(mn) \text{ and } O\left(\frac{mn}{R^2}\right),$$

respectively. Note that after substring selection algorithm we may select at most $$O\left(\frac{mn}{R^2}\right)$$

substrings.

After the above procedures, we convert the localization problem into a shortest path problem in $O(N^2)$, which can be solved in roughly $O(N^2 \log N)$ by using Algorithm 2, where N is the total number of matched magnetic field substrings. So the overall time complexity of Magil is:

$$O\left(\frac{m^2 n^2}{R^4} \log\left(\frac{mn}{R^2}\right)\right). \quad \text{Equation 9}$$

Figure 11:
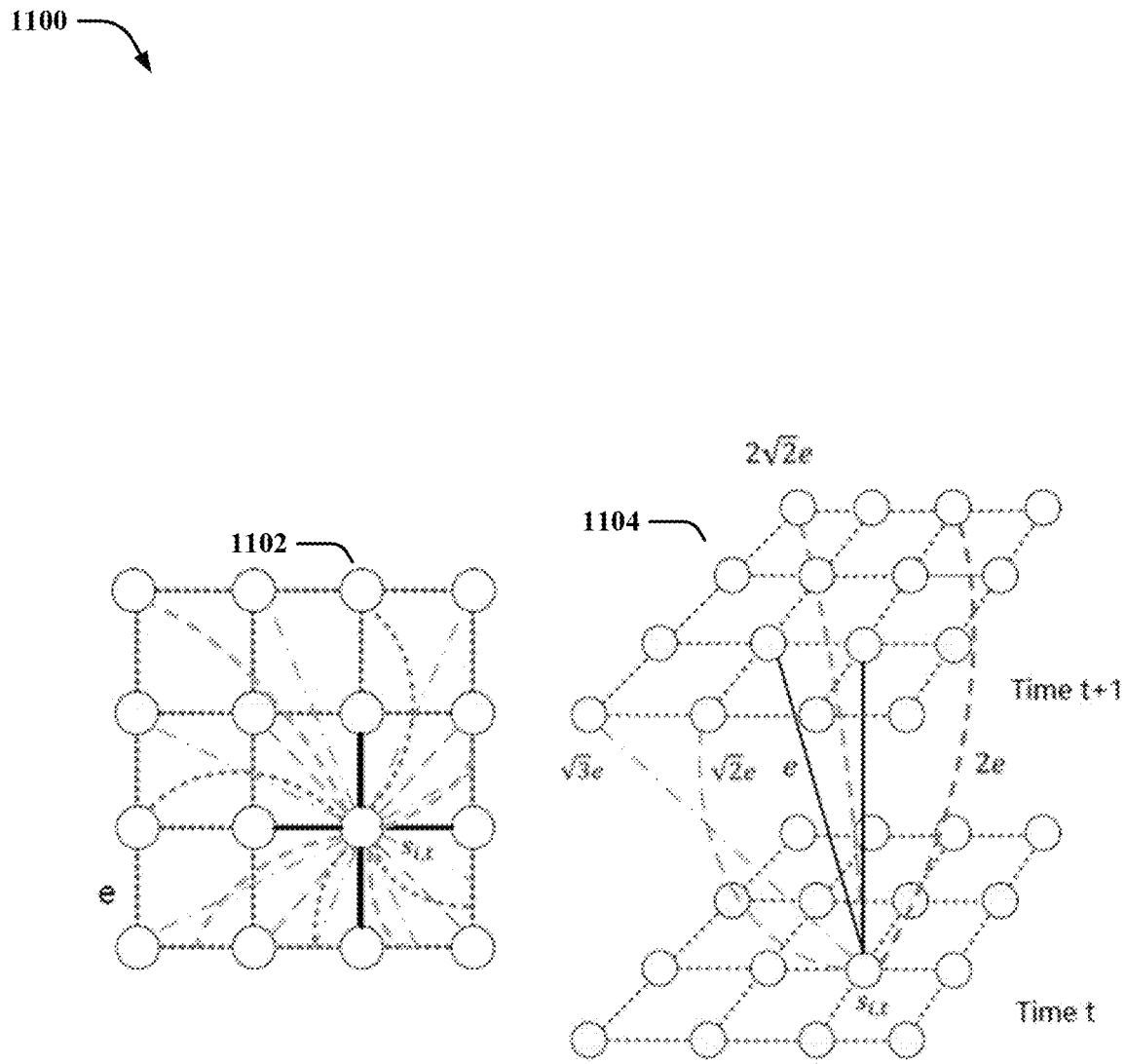
FIG. 11 is another example non-limiting schematic diagram showing a lattice map and transition map between different times according to an aspect or embodiment of the subject disclosure.

Turning now to FIG. 11, we discuss the processes behind implement Mapel, which combines geomagnetic field measurements with step counter data for localization solutions.

In Table 2, we summarize the symbols used in Mapel. In this section, we briefly discuss the remaining offline phase of Mapel, mainly about our CRF structure. Before we go into our model, we first briefly review some drawbacks of particle filter. Traditional particle filter requires explicit or accurate initial position and heavily relies on accurate estimation of user orientation. Otherwise, these disperse particles cannot converge to correct locations. Such drawbacks are marked especially under the unconstrained open space, and still apply in magnetic field fusion. Our observation is that particle filter models user movement as many particles' movements in continuous space, whose computational cost is high. Instead our Mapel models user movement as transition between discrete nodes, which is more robust and computationally efficient.

TABLE 2

| Notations | Defintions |
|---|---|
| $s_{i,t} = [a_i, b_i]$ | Node of state i at time t |
| E | Set of edges formed discretization |
| $\vec{x} = (x_1, \ldots, x_N)$ | N temporal inputs into CRF graphical model |
| $\vec{y} = (y_1, \ldots, y_N)$ | Possible N outputs from CRF graphical model |
| $B_p$ | Geomagnetism readings under phone coordinate system |
| $B_o$ | Geomagnetism observations under earth coordinate system |
| $\Psi_{j,t}(\vec{x}, \vec{y})$ | Potential function of state j of ouput $\vec{y}$ at t given inputs $\vec{x}$ |
| $\Psi_{i,j,t}(\vec{x}, \vec{y})$ | Potential function of states i and j of output $\vec{y}$ at time t with inputs $\vec{x}$ |
| $f_1(x_{t-1}{}^B, x_t{}^B, y_{i,t-1}, y_{j,t})$ | Feature function for magnetic field intensity |
| $f_2(x_{t,o}, y_{i,t-1}, y_{j,t})$ | Feature function for orientation |
| $f_3(x_t{}^l, y_{i,t-1}, y_{j,t})$ | Feature function for step length |
| S | Set of states |
| N | Number of nodes in single layer |

The inner structures of a building mainly impose hard constraints on available pedestrian positions. Hence, the main purpose of map preprocessing is to remove the degrees of freedom from the map where pedestrian is less likely to be. This step takes in a predefined floor plan as input, and generates a lattice consisting of discrete states (indoor locations), while preserving the physical hard constraints between states.

The indoor map discretization is as follows. First, we extract periphery edges from floor plan by finding contours of walls and doors. Second, we divide the plan into small identical squares, or lattice, with edge length e. Note that large e degrades localization accuracy due to low map granularity, while small e increases computational cost. In our localization system, we choose e as the average step length between 0.5 m and 1 m (say, e=0.8 m in our system deployment). Third, we define $S=\{s_{i,t}|1 \leq i \leq N\}$ as nodes of lattice for the moment of each step t, where N is the number of nodes in a layer. FIG. 11 shows the lattice structure 1102. We define the edges of lattice as all adjacent nodes between two consecutive layers.

$$E=\{(s_{i,t}, s_{j,t+1}) | 1 \leq i,j \leq N, |a_i-a_j| \leq 2, |b_i-b_j| \leq 2\},$$

where $a_i$, $a_j$ ($b_i$, $b_j$) represent the x-coordinate (y-coordinate) of nodes i and j in the lattice, respectively. We illustrate an example in 1104. A state $s_{i,t}$ at time t has the following edges to nodes besides $s_{i,t+1}$: the ones along lattice edges (4 edges with length of e, and 4 edges with length of 2e); the ones at the diagonal (4 diagonal edges in green with length of $\sqrt{2}e$, 8 edges with length of $\sqrt{3}e$, and 4 edges with length of $2\sqrt{2}e$) (here we refer to the spacial distance and ignore the one between the consecutive layers).

Finally, during map preprocessing, we discard nodes which are inaccessible, and remove their corresponding edges. This step is significant because there is typically a large number of locations that cannot be accessed from legal regions while removal of these nodes increases computational efficiency We first briefly introduce the theory of conditional random field. Conditional random field (CRF) is a probabilistic graphical model for computing conditional probabilities $p(\vec{y}|\vec{x})$'s among all possible outputs $\vec{y}=(y_1, \ldots, y_n)$ given the inputs $\vec{x}=(x_1, \ldots, x_n)$. It has been applied to many tasks in natural language processing and computer vision fields.

[Based on undirected graphical model, the conditional probability of states $\vec{y}$ given $\vec{x}$ can be written as $$p(\vec{y}|\vec{x}) \propto \prod_{C \in \mathcal{C}} \Psi_C(\vec{x}_C, \vec{y}_C), \quad \text{Equation 10}$$

where $\Psi_C(\vec{x}_C, \vec{y}_C)$'s are the feature functions, or equivalently, potential functions, corresponding to the maximal cliques in the dependency graph [32]. A feature function defines the degree to which the observed signals (observations $\vec{x}$'s) support the transition between two connected states (states $y_{i,t-1}$ and $y_{j,t}$ in our CRF).

Given the lattice map in FIG. 11, we formulate the conditional random field in order to infer the final target locations. In our lattice map, we implement above CRF for target localization. We consider the magnetic field, user motion information (smartphone orientation, step length and step counts) as sequence of inputs $\vec{x}$. Then we implement CRF to find the output sequence $\vec{y}$, which is with the maximum conditional likelihood of all potential states S in the lattice. Specifically, the conditional likelihood by the unary and pairwise potential function is given as follows:

$$p(\vec{y}|\vec{x}) \propto \prod_{t=1}^{T}\left(\prod_{j=1}^{N} \Psi_{j,t}(\vec{x},\vec{y}) \cdot \Psi_{ij,t}(\vec{x},\vec{y}) \prod_{(i,j) \in E_{i,j}}\right), \quad \text{Equation 11}$$

where the unary potential function (or the state factor at node j) is in the form of:

$$\Psi_{j,t}(\vec{x},\vec{y}) = \exp\left(\sum_{k=M'+1}^{M} \lambda_k f_k(\vec{x}, y_{j,t})\right), \quad \text{Equation 12}$$

where M is the total number of potential functions. The unary function represents the node-wise potential between the measured signals at the smartphone and the stored fingerprints. Let $M'$ ($0 \leq M' \leq M$) be the number of pairwise potential functions. The pairwise potential function (or transition factor between $y_{i,t-1}$ and $y_{j,t}$) is defined as $$\Psi_{ij,t}(\vec{x},\vec{y}) = \exp\left(\sum_{k=1}^{M'} \lambda_k f_k(\vec{x}, y_{i,t-1}, y_{j,t})\right), \quad \text{Equation 13}$$

As potential target locations are within the lattice and can only travel between connected states, Mapel constrains potential locations and reduces disperse mappings in indoor area, different from particle filter which suffers from high computation cost.

Here we introduce potential functions (feature functions) in the CRF of Mapel. We specify all the features together with their corresponding observations and how they relate to state transitions. Note that in the CRF of Mapel, we match locations to different states, and consider user movement as transition between states, and at each moment a user is considered to stay at one single state.

Based on the magnetic field and motion sensor signals, in the following we describe how to define the feature functions:

Magnetic field: The first feature function, denoted as $f_1(\bullet)$, expresses the degree to which the magnetic field observations are consistent with fingerprint database. A unary feature function can be first defined as $$f(x_t^B, y_{i,t}) = -(x_t^B - B_i)^T(\Sigma_t)^{-1}(x_t^B - B_i), \quad \text{Equation 14}$$

where $B_i$ is the magnetic field fingerprint data at position $y_{i,t}$, and $\Sigma_t$ is the covariance. However, device heterogeneity may lead to different readings, with remarkable offsets. If the exact offset $\Delta$ between magnetometers is pre-calculated offline, we can replace $x_t^B$ with $x_t^B + \Delta$ in Equation 14 to obtain a usable feature function. Otherwise, measuring the offsets in magnetic field of two consecutive steps t−1 and t, instead of absolute values, is considered in our formulation to address the device heterogeneity problem.

Specifically, the unary function of Equation 14 is transformed into a pairwise function as in Equation 13: we measure the pairwise geomagnetism offset $B_i - B_j$ between states $y_{i,t-1}$ and $y_{j,t}$. Then we deduct this offset from the difference between two consecutive observations and have the following pairwise feature function $$f_1(x_{t-1}^B, x_t^B, y_{i,t-1}, y_{j,t}) = -\vec{z}^T(\Sigma_{t-1,t})^{-1}\vec{z} \quad \text{Equation 15}$$

where $\vec{z}$ is given by $$\vec{z} = (x_{t-1}^B - x_t^B) - (B_i - B_j). \quad \text{Equation 16}$$

Here $B_i$ and $B_j$ are the magnetic field fingerprints at locations $y_{i,t-1}$ and $y_{j,t}$, respectively, while $\Sigma_{t-1,t}$ is the signal covariance between t−1 and t. With Equation 15, we only compare the difference of two adjacent states with the reading offsets of two consecutive steps. In this way, we avoid offline calibration between different smartphone magnetometers.

Orientation and Step Length:

The second and third feature functions consider the extent to which inertial measurements $(x_t^\Theta, x_t^l)$ support the transition between two states.

$$f_2(x_t^\Theta, y_{i,t-1}, y_{j,t}) = I(y_{i,t-1}, y_{j,t}) \cdot \tilde{f}_2(x_t^\Theta, y_{i,t-1}, y_{j,t}),$$

$$f_3(x_t^l, y_{i,t-1}, y_{j,t}) = I(y_{i,t-1}, y_{j,t}) \cdot \tilde{f}_3(x_t^l, y_{i,t-1}, y_{j,t}), \quad \text{Equation 17}$$

where $I(y_{i,t-1}, y_{j,t})$ is an indicator function between states $y_{i,t-1}$ and $y_{j,t}$. We define $I(y_{i,t-1}, y_{j,t}) = 1$, if and only if the states (in lattice), $y_{i,t-1}$ and $y_{j,t}$, are connected. Otherwise, $I(y_{i,t-1}, y_{j,t}) = 0$. Two components of observations, namely the orientation $x_t^\Theta$ and step length $x_t^l$ at time t between states $y_{i,t-1}$ and $y_{j,t}$, are considered to be independent. $f_2(x_t^\Theta, y_{i,t-1}, y_{j,t})$ and $f_3(x_t^l, y_{i,t-1}, y_{j,t})$ are two feature functions to relate orientation and step length with states, respectively. Specifically, $f_2(x_t^\Theta, y_{i,t-1}, y_{j,t})$ is defined as:

$$\tilde{f}_2(x_t^\theta, y_{i,t-1}, y_{j,t}) = \ln\left(\frac{1}{\sqrt{2\pi}\sigma_t^\theta}\right) - \frac{(x_t^\theta - \theta(y_{i,t-1}, y_{j,t}))^2}{2(\sigma_t^\theta)^2}, \quad \text{Equation 18}$$

where $\Theta(y_{i,t-1}, y_{j,t})$ is the orientation of the edge between two states, $y_{i,t-1}$ and $y_{j,t}$, and $\sigma_t^\Theta$ is the orientation variance at time t. Edges from the current state to other neighboring ones are constructed in the lattice in order to represent 16 possible headings in a discretized manner, as shown in FIG. 36 in Section 6.1.1. Another feature function of step length, $f_3(x_t^l, y_{i,t-1}, y_{j,t})$, is defined similarly. In our system, we choose a typical linear frequency model [36] as our generic step model, i.e., $$\text{step length} = a \cdot f + b, \quad \text{Equation 19}$$

where f is frequency in Hz and a,b are constants varying among people. Note that other models may be easily applied in our Mapel. As different users may yield different step lengths, we propose a novel algorithm which dynamically adapts the step model later.

Mapel considers conditional probabilities of several steps instead of only one step measurement within the particle. Therefore, Mapel is more robust to sensor noise at one time stamp than traditional particle filter.

It is worth noting that our CRF can be easily extended to other signals like Wi-Fi fingerprints. By implementing a similar unary feature function of magnetic field like Equation 14, we can easily replace $x_t^B$ with RF fingerprint data (such as Wi-Fi) to measure the degree of signal matching.

CRF model in Mapel combines these feature functions introduced above together into potential functions. We introduce as follows how coefficients $\lambda_i$'s in Equations (12) and (13) are determined in offline CRF training. Training CRF is to find the $\lambda_i$ such that the log-likelihood $\mathcal{L}$ of the training dataset T is maximized, i.e., $$\operatorname*{argmax}_{\{\lambda_i\}} \mathcal{L}(T) = \operatorname*{argmax}_{\{\lambda_i\}} \sum_{(\vec{x},\vec{y}) \in T} \log p(\vec{y}|\vec{x}). \quad \text{Equation 20}$$

where T contains magnetic field signals fingerprint, sensor data collected from walking trajectories, and corresponding ground truths of walking trajectories.

To improve the training efficiency, we enumerate many possible values of $\lambda_i$ and choose the setting which maximizes the log-likelihood. Other choices of $\lambda_i$ may have different influence on the localization performance, and detailed results are presented in the experimental evaluation.

The final step of localization is to find the most likely sequence of $\vec{y}$, i.e. the most likely trajectory, based on the observations. In practice, we prefer the model to generate estimated positions at every step. In fact, at each time the user can only stay in one position. Therefore, we adapt from Viterbi algorithm to compute the marginal probability of each step. More specifically, in each step, the algorithm finds the highest score (likelihood) along the path ending at state s, and gradually fills in a lattice, i.e., $$\delta_t(s|\vec{x}) = \max_{s' \in S, (s',s) \in E} (\delta_{t-1}(s'|\vec{x}) \cdot \Psi_{s',s,t}(\vec{x}, s', s)),$$

$$\pi_t(s|\vec{x}) = \max_{s' \in S, (s',s) \in E} (\delta_{t-1}(s'|\vec{x}) \cdot \Psi_{s',s,t}(\vec{x}, s', s)), \quad \text{Equation 21}$$

However, in some cases, because some edges in E are longer than a typical step length, feature functions described above are slightly modified to capture the motion information in two or more steps. For example, considering edge $e_0 \in E$ whose length is twice as long as typical step length. In this case, $$\delta_t(s|\vec{x}) = \quad \text{Equation 22}$$

$$\max_{s' \in S, e_0 = (s',s) \in E} (\delta_{t-2}(s'|\vec{x}) \cdot \Psi_{s',s,t-1}(\vec{x}, s', s'') \cdot \Psi_{s'',s,t}(\vec{x}, s'', s))$$

where s" is the estimated location of user at time t−1 and can be estimated by using s' and walking direction and step length at time t−1·$\pi_t(s|\vec{x})$ can be defined accordingly. In each step, the most recently filled column of the lattice $\delta_t(\cdot)$ is normalized. Let the total step of the pedestrian be $N_s$. The final sequence $\vec{y}$ can be obtained by first finding:

$$y_{N_s} = \operatorname*{argmax}_{s \in S}(\delta_{N_s}(s|\vec{x})), \quad \text{Equation 23}$$

followed by the recursive search of:

$$y_i = \pi_{i+1}(y_{i+1}), i \in \{N_s-1, N_s-2, \ldots, 1\}. \quad \text{Equation 24}$$

As people's strides vary, simply using the general step model described above for all users may incur large localization error. Next we propose a novel algorithm which dynamically adapts the step model. Initialized with a generic step model, Mapel learns the step length models for different users to further maintain high localization accuracy.

We first present the basic idea. After each step, Mapel returns an estimated trajectory which matches the observations most. We can collect all the magnetic field fingerprint data on the estimated trajectory as the fingerprint data vector, each component of which is an observation $B_o$. Similarly, we also have the ground truth of magnetic field data vector. Along the same trajectory, the magnetic field sequence shape are similar. Therefore, we adopt dynamic time warping (DTW) to compare and match the most similar parts of two vectors. Then we estimate the walking distance using the real-world total distance of the matched part in fingerprint data vector. Given the estimated walking distance, Mapel regresses the model parameters in Equation 17 and hence adapts to different users.

The details of our adaption algorithm are as follows. Observations in one step may not be applicable to estimating walking distance. In those areas where magnetic fields vary little, matching error with DTW can be large. Here we aggregate magnetic field readings from several consecutive steps together and perform DTW on the aggregated observations only when the range of magnetic field magnitude readings is larger than a threshold, say, 5 µT in our system. Since we prefer matching shape characteristics of series (such as peaks and slopes) rather than actual values, we perform DTW on the first-order derivatives on each dimension of magnetic field features (Derivative Dynamic Time Warping [47], or DDTW), and calculate the distance between the i-th observation $B_t(i)$ at target and the j-th magnetic field fingerprint $B_f(j)$ using L2-norm distance, i.e.

$$D(B_t(i), B_f(j)) = \sqrt{\sum_{k=1}^{3} [der(B_t(i,k)) - der(B_f(j,k))]^2}, \quad \text{Equation 25}$$

where $$der(B_t(i,k)) = \frac{1}{2}(B_t(i+1,k) - B_t(i-1,k)),$$

$$der(B_f(j,k)) = \frac{1}{2}(B_f(j+1,k) - B_f(j-1,k)),$$

$B_t(i,k)$ and $B_f(j,k)$ are the k-th dimension of $B_t(i)$ and $B_f(j)$, respectively, given the definition of magnetic field features in Equation 3.

After this we obtain a number of triplets: (total number of steps in one aggregation, sum of step frequencies, estimated walking distance obtained from DDTW matching). Since $$\sum_{i=1}^{S}(a + f_i \cdot b) = a \cdot S + b \cdot \sum_{i=1}^{S} f_i$$

where S is the number of steps in one aggregation, the final personalized step model is obtained by linear regression on these triplets. It can be further leveraged in Mapel to improve localization accuracy.

The time complexity of estimating trajectory is $O(|S| \cdot N_s)$, where S is the set of states. If the number of states is too large, the algorithm may suffer from high computational cost. In the case of real-time tracking, we also introduce some heuristics to improve the performance. First, Mapel can conduct exhaustive search over the whole site in the first few steps (initialization), until there are only a few states whose scores (likelihood values) are much higher than others. Then Mapel conducts localization over these states discovered. Second, if Mapel finds in some step that the sum of all states' scores (likelihoods) before normalization is notably small, then it stops and restarts the localization (when signal noise is large or under abnormal holding gestures by users).

The time complexity of step model learning is $O(KM_f M_o)$, where K is the number of triplets, $M_f$ is the maximum length of fingerprint data vector in the triplets and $M_o$ is the maximum length of magnetic field ground-truth observations (vector) in the triplets. Note that the step length model can be computed online, making the system adaptive to different users.

Figure 12:
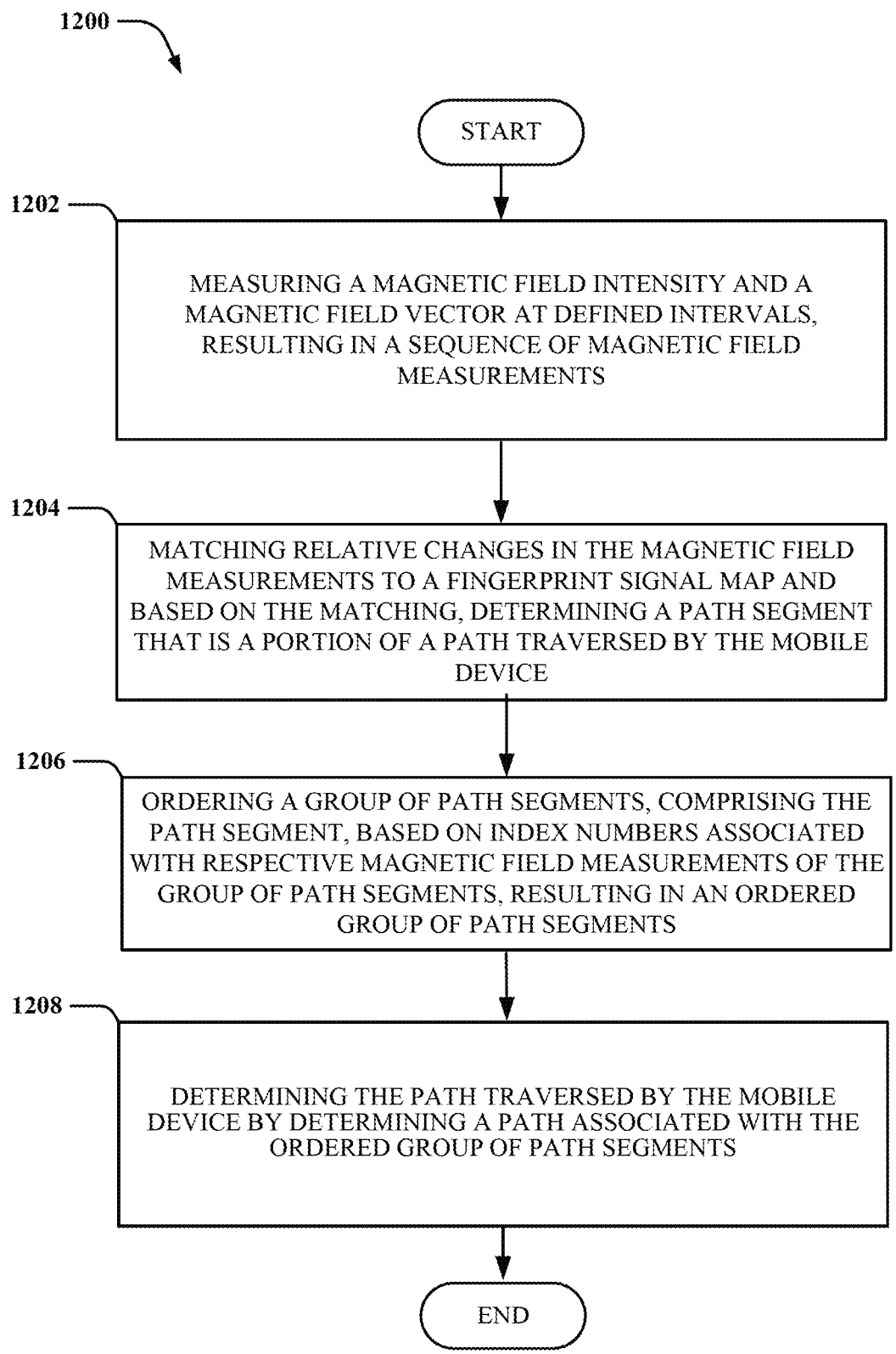
FIG. 12 is an example non-limiting process flow diagram of a method for indoor localization using geomagnetic fields according to an aspect or embodiment of the subject disclosure.

For simplicity of explanation, the methods (or procedures) are depicted and described as a series of acts. It is noted that the various embodiments are not limited by the acts illustrated and/or by the order of acts. For example, acts can occur in various orders and/or concurrently, and with other acts not presented or described herein. In another aspect, the various acts can be performed by systems and/or components of embodiments described herein FIG. 12 is an example non-limiting process flow diagram of a method 1200 method for indoor localization using geomagnetic fields according to an aspect or embodiment of the subject disclosure.

Method 1200 can begin at 1202, where the method includes measuring a magnetic field intensity and a magnetic field vector at defined intervals, resulting in a sequence of magnetic field measurements.

At step 1204, the method can include matching relative changes in the magnetic field measurements to a fingerprint signal map and based on the matching, determining a path segment that is a portion of a path traversed by the mobile device.

At 1206, the method can include ordering a group of path segments, comprising the path segment, based on index numbers associated with respective magnetic field measurements of the group of path segments, resulting in an ordered group of path segments.

At 1208, the method can include determining the path traversed by the mobile device by determining a path associated with the ordered group of path segments.

Figure 13:
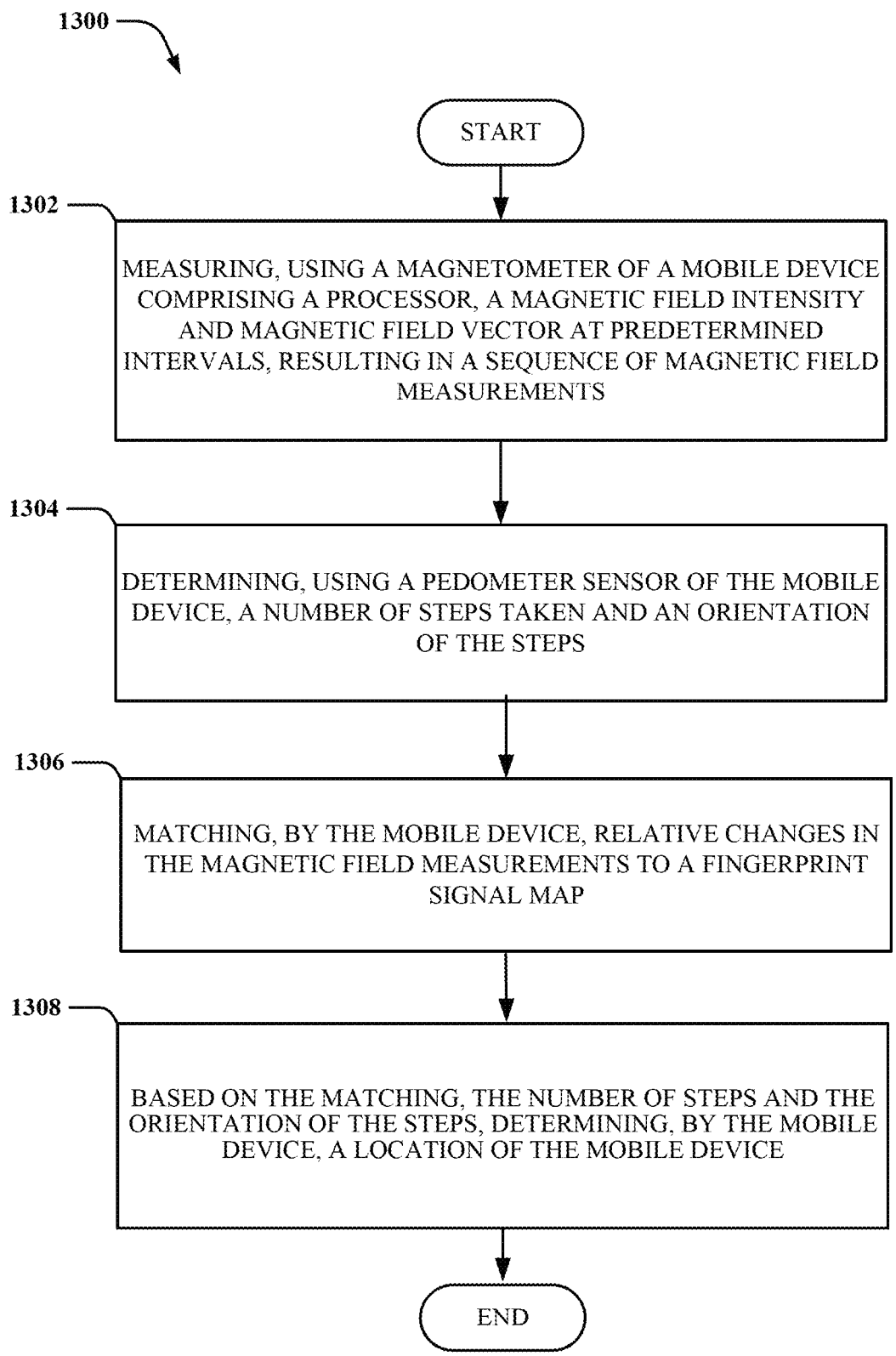
FIG. 13 is an example non-limiting process flow diagram of a method for indoor localization using geomagnetic fields and a step counter according to an aspect or embodiment of the subject disclosure.

FIG. 13 is an example non-limiting process flow diagram of a method 1300 for indoor localization using geomagnetic fields and a step counter according to an aspect or embodiment of the subject disclosure.

Method 1300 can begin at 1302, where the method includes measuring, using a magnetometer of a mobile device comprising a processor, a magnetic field intensity and magnetic field vector at predetermined intervals, resulting in a sequence of magnetic field measurements.

At step 1304, the method can include determining, using a pedometer sensor of the mobile device, a number of steps taken and an orientation of the steps.

At 1306, the method can include matching, by the mobile device, relative changes in the magnetic field measurements to a fingerprint signal map.

At 1308, the method can include based on the matching, the number of steps and the orientation of the steps, determining, by the mobile device, a location of the mobile device.

Figure 14:
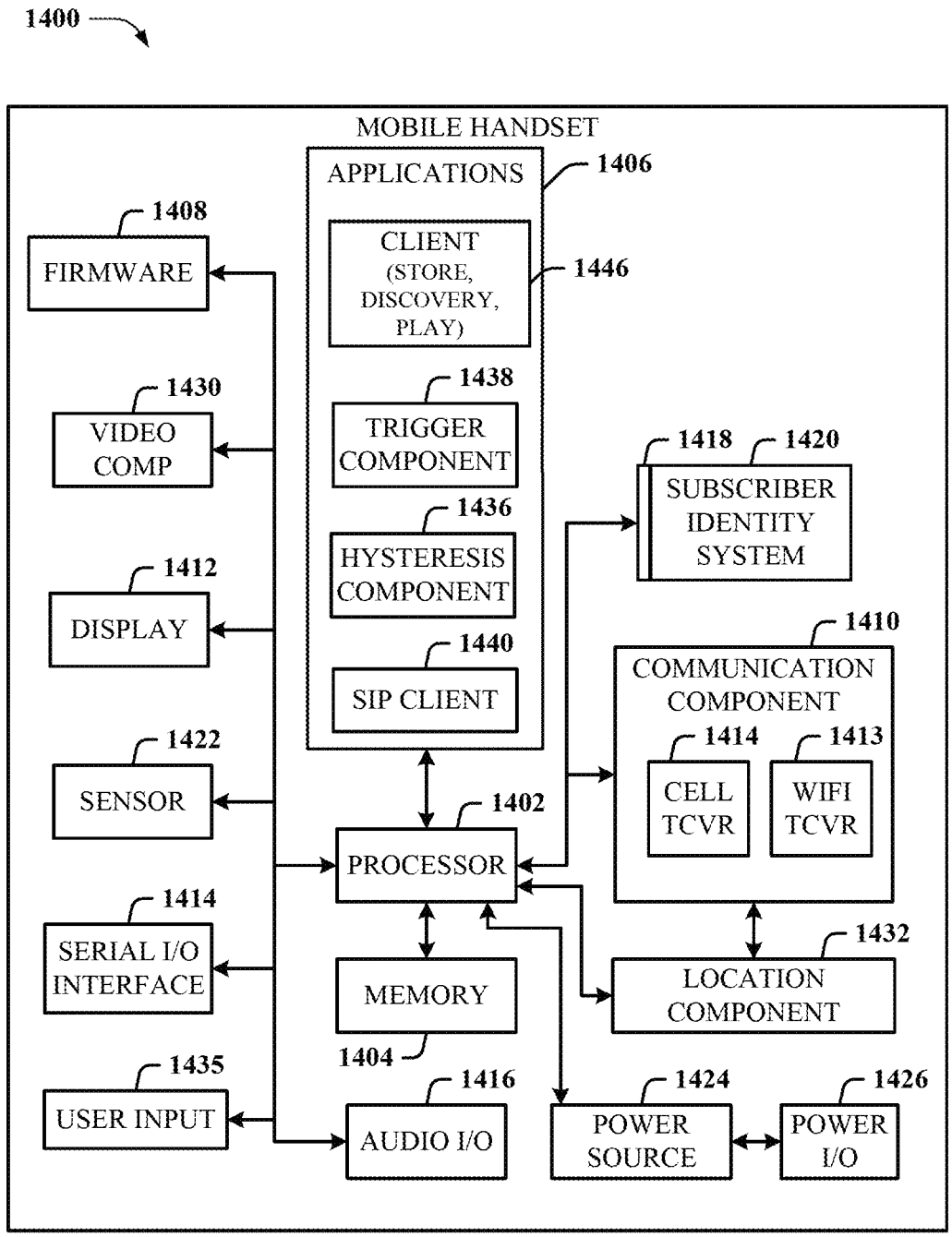
FIG. 14 illustrates an example embodiment of a mobile device according to the subject disclosure.

Referring now to FIG. 14, illustrated is a schematic block diagram of an example end-user device such as a user equipment) that can be a mobile device 1400 capable of connecting to a network in accordance with some embodiments described herein. Although a mobile handset 1400 is illustrated herein, it will be understood that other devices can be a mobile device, and that the mobile handset 1400 is merely illustrated to provide context for the embodiments of the various embodiments described herein. The following discussion is intended to provide a brief, general description of an example of a suitable environment 1400 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1400 includes a processor 1402 for controlling and processing all onboard operations and functions. A memory 1404 interfaces to the processor 1402 for storage of data and one or more applications 1406 (e.g., a video player software, user feedback component software, etc.). Other applications can include voice recognition of predetermined voice commands that facilitate initiation of the user feedback signals. The applications 1406 can be stored in the memory 1404 and/or in a firmware 1408, and executed by the processor 1402 from either or both the memory 1404 or/and the firmware 1408. The firmware 1408 can also store startup code for execution in initializing the handset 1400. A communications component 1410 interfaces to the processor 1402 to facilitate wired/wireless communication with external systems, e.g., cellular networks, VoIP networks, and so on. Here, the communications component 1410 can also include a suitable cellular transceiver 1411 (e.g., a GSM transceiver) and/or an unlicensed transceiver 1413 (e.g., Wi-Fi, WiMax) for corresponding signal communications. The handset 1400 can be a device such as a cellular telephone, a PDA with mobile communications capabilities, and messaging-centric devices. The communications component 1410 also facilitates communications reception from terrestrial radio networks (e.g., broadcast), digital satellite radio networks, and Internet-based radio services networks.

The handset 1400 includes a display 1412 for displaying text, images, video, telephony functions (e.g., a Caller ID function), setup functions, and for user input. For example, the display 1412 can also be referred to as a "screen" that can accommodate the presentation of multimedia content (e.g., music metadata, messages, wallpaper, graphics, etc.). The display 1412 can also display videos and can facilitate the generation, editing and sharing of video quotes. A serial I/O interface 1414 is provided in communication with the processor 1402 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1400, for example. Audio capabilities are provided with an audio I/O component 1416, which can include a speaker for the output of audio signals related to, for example, indication that the user pressed the proper key or key combination to initiate the user feedback signal. The audio I/O component 1416 also facilitates the input of audio signals through a microphone to record data and/or telephony voice data, and for inputting voice signals for telephone conversations.

The handset 1400 can include a slot interface 1418 for accommodating a SIC (Subscriber Identity Component) in the form factor of a card Subscriber Identity Module (SIM) or universal SIM 1420, and interfacing the SIM card 1420 with the processor 1402. However, it is to be appreciated that the SIM card 1420 can be manufactured into the handset 1400, and updated by downloading data and software.

The handset 1400 can process IP data traffic through the communication component 1410 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A sensor component 1422 (e.g., a magnetometer, pedometer) can be provided for sensing magnetic fields, or steps taken, stride length, and etc in accordance with one or more embodiments disclosed herein. The handset 1400 also includes a power source 1424 in the form of batteries and/or an AC power subsystem, which power source 1424 can interface to an external power system or charging equipment (not shown) by a power I/O component 1426.

The handset 1400 can also include a video component 1430 for processing video content received and, for recording and transmitting video content. For example, the video component 1430 can facilitate the generation, editing and sharing of video quotes. A location tracking component 1432 facilitates geographically locating the handset 1400. As described hereinabove, this can occur when the user initiates the feedback signal automatically or manually. A user input component 1434 facilitates the user initiating the quality feedback signal. The user input component 1434 can also facilitate the generation, editing and sharing of video quotes. The user input component 1434 can include such conventional input device technologies such as a keypad, keyboard, mouse, stylus pen, and/or touch screen, for example.

Referring again to the applications 1406, a hysteresis component 1436 facilitates the analysis and processing of hysteresis data, which is utilized to determine when to associate with the access point. A software trigger component 1438 can be provided that facilitates triggering of the hysteresis component 1438 when the Wi-Fi transceiver 1413 detects the beacon of the access point. A SIP client 1440 enables the handset 1400 to support SIP protocols and register the subscriber with the SIP registrar server. The applications 1406 can also include a client 1442 that provides at least the capability of discovery, play and store of multimedia content, for example, music.

The handset 1400, as indicated above related to the communications component 810, includes an indoor network radio transceiver 1413 (e.g., Wi-Fi transceiver). This function supports the indoor radio link, such as IEEE 802.11, for the dual-mode GSM handset 1400. The handset 1400 can accommodate at least satellite radio services through a handset that can combine wireless voice and digital radio chipsets into a single handheld device.

Figure 15:
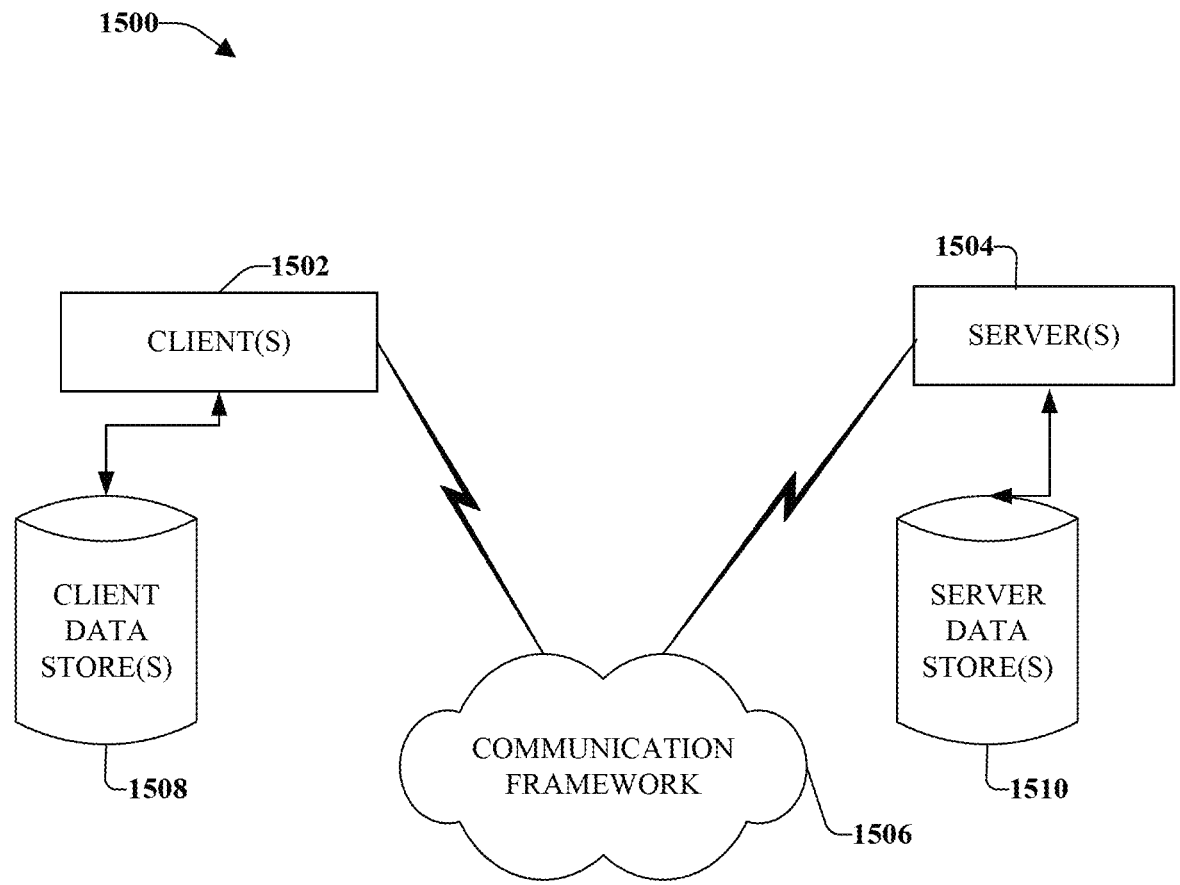
FIG. 15 illustrates an example schematic block diagram of a computing environment in accordance various aspects of this disclosure.

Referring now to FIG. 15, there is illustrated a schematic block diagram of a computing environment 1500 in accordance with this specification. The system 1500 includes one or more client(s) 1502, (e.g., computers, smart phones, tablets, cameras, PDA's). The client(s) 1502 can be hardware and/or software (e.g., threads, processes, computing devices). The client(s) 1502 can house cookie(s) and/or associated contextual information by employing the specification, for example.

The system 1500 also includes one or more server(s) 1504. The server(s) 1504 can also be hardware or hardware in combination with software (e.g., threads, processes, computing devices). The servers 1504 can house threads to perform transformations by employing aspects of this disclosure, for example. One possible communication between a client 1502 and a server 1504 can be in the form of a data packet adapted to be transmitted between two or more computer processes wherein data packets may include coded items. The data packet can include a cookie and/or associated contextual information, for example. The system 1500 includes a communication framework 1506 (e.g., a global communication network such as the Internet) that can be employed to facilitate communications between the client(s) 1502 and the server(s) 1504.

Communications can be facilitated via a wired (including optical fiber) and/or wireless technology. In an aspect, communications between client(s) 1502 and network devices (e.g., server(s) 1504) are through wireless channels. In another aspect, communication links between network devices (e.g., servers(s) 1504) can be via wireless and/or wired channels. It is noted that wireless connections between client(s) 1502 and network devices (e.g., server(s) 1504) are described herein, however client(s) 1502 may have other capabilities (e.g., wired communications capabilities). The client(s) 1502 are operatively connected to one or more client data store(s) 1508 that can be employed to store information local to the client(s) 1502 (e.g., cookie(s) and/or associated contextual information). Similarly, the server(s) 1504 are operatively connected to one or more server data store(s) 1510 that can be employed to store information local to the servers 1504.

In one implementation, a server 1504 can transfer an encoded file, (e.g., network selection policy, network condition information, etc.), to client 1502. Client 1502 can store the file, decode the file, or transmit the file to another client 1502. It is noted, that a server 1504 can also transfer uncompressed file to a client 1502 and client 1502 can compress the file in accordance with the disclosed subject matter. Likewise, server 1504 can encode information and transmit the information via communication framework 1506 to one or more clients 1502.

Figure 16:
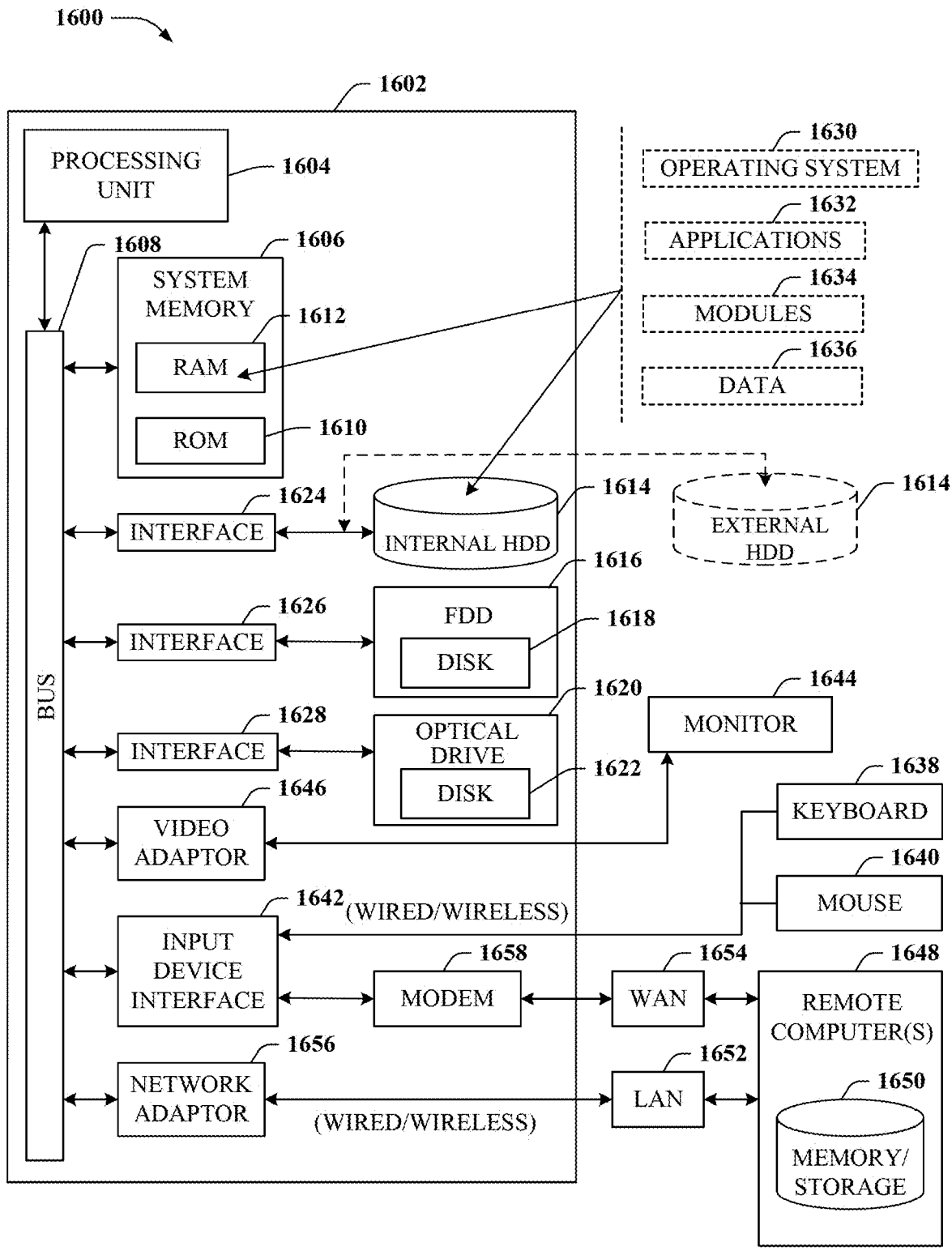
FIG. 16 illustrates a block diagram of a computer operable to execute the disclosed communication architecture.

Referring now to FIG. 16, there is illustrated a block diagram of a computer operable to execute the disclosed communication architecture. In order to provide additional context for various aspects of the subject specification, FIG. 16 and the following discussion are intended to provide a brief, general description of a suitable computing environment 1600 in which the various aspects of the specification can be implemented. While the specification has been described above in the general context of computer-executable instructions that can run on one or more computers, it is noted that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments, including cloud-computing environments, where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically include (and/or facilitate the transmission of) computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media.

With reference again to FIG. 16, the example environment 1600 for implementing various aspects of the specification includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes read-only memory (ROM) 1610 and random access memory (RAM) 1612. A basic input/output system is stored in a non-volatile memory 1610 such as ROM, erasable programmable read only memory, electrically erasable programmable read only memory, which basic input/output system contains the basic routines that help to transfer information between elements within the computer 1602, such as during startup. The RAM 1612 can also include a high-speed RAM such as static RAM for caching data.

The computer 1602 further includes an internal hard disk drive 1614 (e.g., EIDE, SATA), which internal hard disk drive 1614 can also be configured for external use in a suitable chassis (not shown), a magnetic floppy disk drive 1616, (e.g., to read from or write to a removable diskette 1618) and an optical disk drive 1620, (e.g., reading a CD-ROM disk 1622 or, to read from or write to other high capacity optical media such as the DVD). The hard disk drive 1614, magnetic disk drive 1616 and optical disk drive 1620 can be connected to the system bus 1608 by a hard disk drive interface 1624, a magnetic disk drive interface 1626 and an optical drive interface 1628, respectively. The interface 1624 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. It is noted that the specification can be implemented with various commercially available operating systems or combinations of operating systems.

A user can enter commands and information into the computer 1602 through one or more wired/wireless input devices, e.g., a keyboard 1638 and a pointing device, such as a mouse 1640. Other input devices (not shown) can include a microphone, an IR remote control, a joystick, a game pad, a stylus pen, touch screen, or the like. These and other input devices are often connected to the processing unit 1604 through an input device interface 1642 that is coupled to the system bus 1608, but can be connected by other interfaces, such as a parallel port, an IEEE 1394 serial port, a game port, a USB port, an IR interface, etc.

A monitor 1644 or other type of display device is also connected to the system bus 1608 via an interface, such as a video adapter 1646. In addition to the monitor 1644, a computer typically includes other peripheral output devices (not shown), such as speakers, printers, etc.

The computer 1602 can operate in a networked environment using logical connections via wired and/or wireless communications to one or more remote computers, such as a remote computer(s) 1648. The remote computer(s) 1648 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1650 is illustrated. The logical connections depicted include wired/wireless connectivity to a local area network 1652 and/or larger networks, e.g., a wide area network 1654. Such local area network and wide area network networking environments are commonplace in offices and companies, and facilitate enterprise-wide computer networks, such as intranets, all of which can connect to a global communications network, e.g., the Internet.

When used in a local area network networking environment, the computer 1602 is connected to the local network 1652 through a wired and/or wireless communication network interface or adapter 1656. The adapter 1656 can facilitate wired or wireless communication to the local area network 1652, which can also include a wireless access point disposed thereon for communicating with the wireless adapter 1656.

When used in a wide area network environment, the computer 1602 can include a modem 1658, or is connected to a communications server on the wide area network 1654, or has other means for establishing communications over the wide area network 1654, such as by way of the Internet. The modem 1658, which can be internal or external and a wired or wireless device, is connected to the system bus 1608 via the serial port interface 1642. In a networked environment, program modules depicted relative to the computer 1602, or portions thereof, can be stored in the remote memory/storage device 1650. It is noted that the network connections shown are example and other means of establishing a communications link between the computers can be used.

The computer 1602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. In an example embodiment, wireless communications can be facilitated, for example, using Wi-Fi, Bluetooth™, Zigbee, and other 802.XX wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks can operate in the unlicensed 2.4 and 5 GHz radio bands, at an 12 Mbps (802.11a), 54 Mbps (802.11b), or 150 Mbps (802.11n) data rate, for example, or with products that contain both bands (dual band), so the networks can provide real-world performance similar to wired Ethernet networks used in many homes and/or offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," and substantially any other information storage component relevant to operation and functionality of a component, refer to "memory components," or entities embodied in a "memory" or components comprising the memory. It is noted that the memory components, or computer-readable storage media, described herein can be either volatile memory(s) or nonvolatile memory(s), or can include both volatile and nonvolatile memory(s).

By way of illustration, and not limitation, nonvolatile memory(s) can include read only memory (ROM), programmable ROM (PROM), electrically programmable ROM (EPROM), electrically erasable ROM (EEPROM), or flash memory. Volatile memory(s) can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "module," "system," "interface," "platform," "service," "framework," "connector," "controller," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A mobile device, comprising:
a processor; and
a memory that stores executable instructions that, when executed by the processor, facilitate performance of operations, comprising:
measuring a magnetic field intensity and a magnetic field vector at defined intervals, resulting in a sequence of magnetic field measurements;
matching relative changes in the magnetic field measurements to a fingerprint signal map and based on the matching, determining a path segment that is a portion of a path traversed by the mobile device;
ordering a group of path segments, comprising the path segment, based on index numbers associated with respective magnetic field measurements of the group of path segments, resulting in an ordered group of path segments;
determining the path traversed by the mobile device by determining a path associated with the ordered group of path segments; and
generating the fingerprint signal map by taking fingerprint signal measurements at defined time intervals while traversing a defined survey path, wherein the generating the fingerprint signal map comprises matching a fingerprint signal to a location based on a time stamp of the fingerprint signal and a time period spanning two direction changes of the mobile device.

2. The mobile device of claim 1, wherein the index numbers are associated with a time stamp based on times that the magnetic field measurements were obtained.

3. The mobile device of claim 1, wherein the operations further comprise:
applying a piecewise aggregate approximation to the fingerprint signal map to reduce data dimensionality of the fingerprint signal map.

4. The mobile device of claim 1, wherein the fingerprint signal map is stored in a data store on the mobile device.

5. The mobile device of claim 1, wherein the measuring the magnetic field intensity and the magnetic field vector is performed by a magnetometer.

6. The mobile device of claim 1, wherein lengths of the defined intervals are based on respective determined walking speeds.

7. The mobile device of claim 1, wherein the operations further comprise:
measuring a received signal strength indicator associated with a Wi-Fi signal; and
constraining a location of the path segment based on the received signal strength indicator.

8. A method, comprising:
measuring, using a magnetometer of a mobile device comprising a processor, a magnetic field intensity and magnetic field vector at specified intervals, resulting in a sequence of magnetic field measurements;
determining, using a pedometer sensor of the mobile device, a number of steps taken and an orientation of the steps;
matching, by the mobile device, relative changes in the magnetic field measurements to a fingerprint signal map;
based on the matching, the number of steps and the orientation of the steps, determining, by the mobile device, a location of the mobile device; and
generating, by the mobile device, the fingerprint signal map by determining fingerprint signal measurements while traversing a defined survey path, wherein the generating the fingerprint signal map comprises matching a fingerprint signal to a location based on a time stamp of the fingerprint signal and a time period from a first time of a first direction change of the mobile device to a second time of a second direction change of the mobile device.

9. The method of claim 8, wherein the fingerprint signal map comprises a lattice of nodes, and wherein each node of the lattice of nodes has an associated fingerprint signal measurement.

10. The method of claim 9, wherein each node of the lattice of nodes is labeled with a respective location based on an output of the pedometer sensor.

11. The method of claim 9, wherein the determining the location of the mobile device comprises determining at which node of the lattice of nodes that the mobile device is located.

12. The method of claim 8, further comprising:
calibrating, by the mobile device, a step model associated with a walking distance and a step length based on the number of steps taken, the orientation of the steps and a relative change in the magnetic field measurements along a walking path.

13. The method of claim 8, further comprising:
measuring, by the mobile device, a received signal strength indicator associated with a Wi-Fi signal; and
constraining, by the mobile device, a location of a path segment based on the received signal strength indicator.

14. The method of claim 8, wherein lengths of the specified intervals are based on respective determined walking speeds.

15. The method of claim 8, further comprising:
storing, by the mobile device, the fingerprint signal map to a data store that is part of the mobile device.

16. The method of claim 8, further comprising:
applying, by the mobile device, a piecewise aggregate approximation to the fingerprint signal map to reduce data dimensionality of the fingerprint signal map.

17. A non-transitory computer-readable medium storing computer-executable instructions that, in response to execution, cause a system comprising a processor to perform operations, comprising:

collecting, via a magnetometer of a mobile device, a group of magnetic field measurements, wherein each magnetic field measurement of the group of magnetic field measurements is collected after a respective predefined time interval;
matching relative changes in the group of magnetic field measurements to a relative magnetic field levels associated with a fingerprint signal map and based on the matching, determining a path segment that is a portion of a path that has been traversed by the mobile device;
ordering a group of path segments, comprising the path segment, based on index numbers associated with respective magnetic field measurements of the group of path segments, resulting in an ordered group of path segments, wherein the index numbers are associated with time stamps based on respective times that the group of magnetic field measurements were obtained;
determining the path traversed by the mobile device by determining a path associated with the ordered group of path segments; and
matching a fingerprint signal measurement, of a fingerprint signal, to a location based on a time stamp of the fingerprint signal and a time period between two direction changes of the mobile device.

18. The non-transitory computer-readable medium of claim 17, wherein the operations further comprise:
generating the fingerprint signal map by taking fingerprint signal measurements while traversing a predetermined survey path at predetermined time intervals.

19. The non-transitory computer-readable medium of claim 18, wherein lengths of the predetermined time intervals are based on respective determined walking speeds.

20. The non-transitory computer-readable medium of claim 17, wherein the operations further comprise:
measuring a received signal strength indicator associated with a radio signal; and
constraining a location of the path segment based on the received signal strength indicator.

* * * * *